(12) United States Patent
Haq et al.

(10) Patent No.: US 12,503,639 B2
(45) Date of Patent: Dec. 23, 2025

(54) METHOD OF STORING HYDROGEN GAS IN A SUBSURFACE FORMATION

(71) Applicant: KING FAHD UNIVERSITY OF PETROLEUM AND MINERALS, Dhahran (SA)

(72) Inventors: Md Bashirul Haq, Dhahran (SA); Dhafer Abdullah Al Shehri, Dhahran (SA); Nasiru Salahu Muhammed, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 282 days.

(21) Appl. No.: 18/315,159

(22) Filed: May 10, 2023

(65) Prior Publication Data
US 2024/0376372 A1 Nov. 14, 2024

(51) Int. Cl.
*B65G 5/00* (2006.01)
*B01D 53/22* (2006.01)
*C09K 8/594* (2006.01)

(52) U.S. Cl.
CPC ............ *C09K 8/594* (2013.01); *B01D 53/226* (2013.01); *B65G 5/005* (2013.01)

(58) Field of Classification Search
CPC ........ C09K 8/594; B01D 53/226; B65G 5/00; B65G 5/005; Y02E 60/32
See application file for complete search history.

(56) References Cited

U.S. PATENT DOCUMENTS

| 6,306,198 B1 * | 10/2001 | Corbin | B01D 53/04 95/902 |
| 2004/0023087 A1 * | 2/2004 | Redmond | B82Y 30/00 222/3 |

(Continued)

FOREIGN PATENT DOCUMENTS

| CN | 115218118 A | 10/2022 |
| EP | 1 640 654 B1 | 10/2016 |

(Continued)

OTHER PUBLICATIONS

Heinemann et al., Enabling large-scale hydrogen storage in porous media—the scientific challenge, 2021, Energy and Environmental Science, Royal Society of Chemistry, pp. 853-864 (Year: 2021).*

(Continued)

*Primary Examiner* — Carib A Oquendo
(74) *Attorney, Agent, or Firm* — Oblon, McClelland, Maier & Neustadt, L.L.P.

(57) ABSTRACT

A method of storing hydrogen ($H_2$) gas in a subsurface formation having an injection well, a production well and a heat well. The method includes injecting a $H_2$-containing fluid stream into the subsurface formation via the injection well to form a storage composition containing a gas-phase mixture, a liquid-phase mixture and a solid matrix; and heating the subsurface formation containing the storage composition via the heat well thereby achieving a storage condition and maintaining the storage condition. The gas-phase mixture includes 10 to 90% of $H_2$, 5 to 80% of methane ($CH_4$), 1 to 10% of carbon dioxide ($CO_2$), and 1 to 10% of nitrogen ($N_2$). Each % is based on a total volume of the gas-phase mixture. The liquid-phase mixture includes a water-soluble mineral; and the solid matrix includes clay, shale, slate, and minerals.

19 Claims, 25 Drawing Sheets

100 ⟶

102 — Inject $H_2$-containing fluid stream into subsurface formation via at least one injection well to form a storage composition containing a gas-phase mixture, a liquid-phase mixture and a solid matrix, in which the gas-phase mixture includes 10 to 90 % of $H_2$, 5 to 80 % of methane ($CH_4$), 1 to 10 % of carbon dioxide ($CO_2$), 1 to 10 % of nitrogen ($N_2$), and each % is based on a total volume of the gas-phase mixture, the liquid-phase mixture includes at least one water-soluble mineral, and the solid matrix includes clay, shale, slate, and minerals 104 — Heat the subsurface formation containing the storage composition via at least one heat well thereby achieving a storage condition and maintaining the storage condition

(56) References Cited

U.S. PATENT DOCUMENTS

| | | | |
|---|---|---|---|
| 2010/0163804 A1* | 7/2010 | Schenck | C01B 3/36 |
| | | | 422/600 |
| 2012/0255730 A1* | 10/2012 | Daub | E21B 43/28 |
| | | | 166/272.3 |
| 2016/0089705 A1* | 3/2016 | Oates | B09C 1/02 |
| | | | 405/57 |

FOREIGN PATENT DOCUMENTS

| | | |
|---|---|---|
| RU | 2 713 349 C1 | 2/2020 |
| WO | 2022/232630 A1 | 11/2022 |

OTHER PUBLICATIONS

Pinto et al. ; Modeling phase equilibrium of hydrogen and natural gas in brines: Application to storage in salt caverns ; Elsevier 2020 ; 26 Pages.

Zamehrian et al. ; Underground hydrogen storage in a partially depleted gas condensate reservoir: influence of cushion gas ; Journal of Petroleum Science and Engineering vol. 212 ; 5 Pages.

Pfeiffer et al. ; Porous media hydrogen storage at a synthetic, heterogenous field site: numerical simulation of storage operation and geophysical monitoring ; Environmental Earth Sciences 75 ; Aug. 16, 2016 ; Abstract Only ; 2 Pages.

\* cited by examiner

100 ⟶

102 ⟶ Inject $H_2$-containing fluid stream into subsurface formation via at least one injection well to form a storage composition containing a gas-phase mixture, a liquid-phase mixture and a solid matrix, in which the gas-phase mixture includes 10 to 90 % of $H_2$, 5 to 80 % of methane ($CH_4$), 1 to 10 % of carbon dioxide ($CO_2$), 1 to 10 % of nitrogen ($N_2$), and each % is based on a total volume of the gas-phase mixture, the liquid-phase mixture includes at least one water-soluble mineral, and the solid matrix includes clay, shale, slate, and minerals 104 ⟶ Heat the subsurface formation containing the storage composition via at least one heat well thereby achieving a storage condition and maintaining the storage condition

FIG. 1

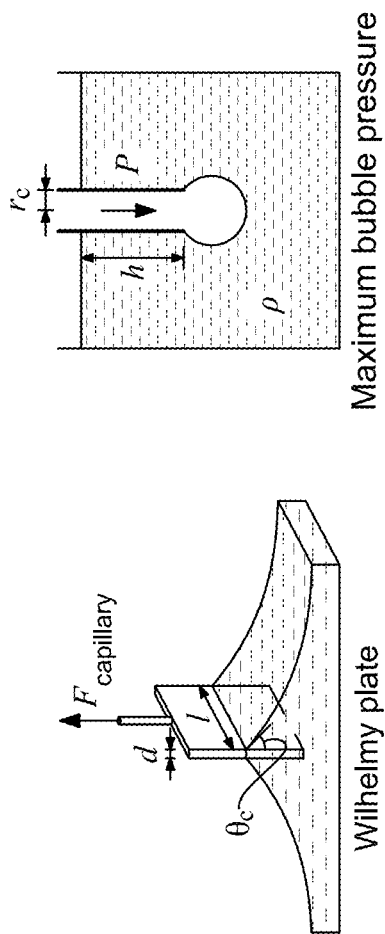
FIG. 4A Wilhelmy plate
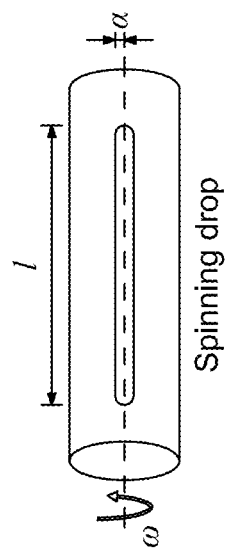
FIG. 4B Maximum bubble pressure
FIG. 4C Spinning drop
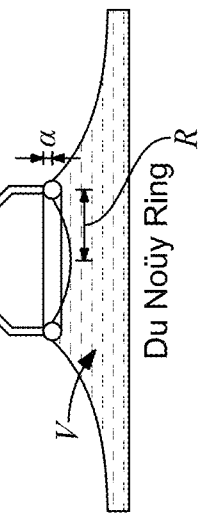
FIG. 4D Du Noüy Ring
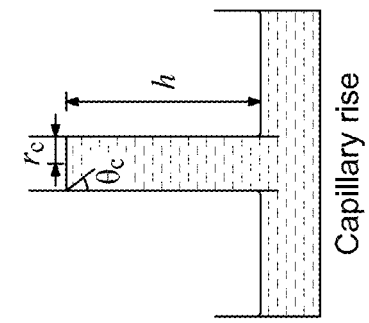
FIG. 4E Capillary rise
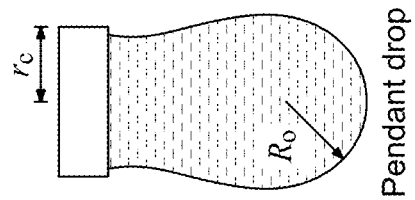
FIG. 4F Pendant drop

METHOD OF STORING HYDROGEN GAS IN A SUBSURFACE FORMATION

STATEMENT REGARDING PRIOR DISCLOSURE BY THE INVENTORS

Aspects of this technology are described in "Role of methane as a cushion gas for hydrogen storage in depleted gas reservoirs" published in International Journal of Hydrogen Energy, 2023, which is incorporated herein by reference in its entirety.

BACKGROUND

Technical Field

The present disclosure is directed to a method of storing hydrogen ($H_2$) in depleted gas reservoirs and improving the hydrogen geo-storage capacity.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Alternative energy sources to fossil fuels, such as carbon-free solar panels, carbon-free wind power, geothermal energy, and hydrogen ($H_2$) production, are being explored due to the urgent environmental concern of rising $CO_2$ levels in the atmosphere. Green $H_2$ production through sustainable methods, such as water electrolysis technology, can be employed with zero-carbon emissions. However, most $H_2$ production currently relies on the usage of fossil fuels and carbon-intensive processes such as natural gas steam reforming or coal gasification, both of which emit large amounts of $CO_2$. Hydrogen-natural gas blends are critical in bridging the gap between present grey carbon-based and future green $H_2$ technologies. Despite numerous advantages of $H_2$ in various industries such as chemical, food, pharmaceuticals, metallurgical, transport, aviation, and maritime sectors, safe and effective storage and gas transportation remains a significant issue for practical applications. One reason for the appeal of hydrogen/natural gas blend is that, unlike pure $H_2$, they can be transported to end-use devices using existing natural gas pipes. Additionally, these blends can also help minimize $CO_2$ emissions when natural gas is used by compensating for the lower heating value (244 kJ/mol) of $H_2$, thus boosting the total energy density.

Porous geological formations such as aquifers or depleted oil and gas reservoirs are suitable options for large-scale storage of hydrogen/natural gas mixtures due to their ample storage space. Depleted natural gas reservoirs are reliable since their imperviousness (resistance) over geological time has already been proven. Moreover, they do not require a confirmatory test in terms of tectonics and caprock sealing integrity (as in the case of aquifers) since they have previously stored natural gas. However, the solubility and miscibility of $H_2$ with water and oil in depleted oil reservoirs contribute to $H_2$ loss, making the investigation of these phenomena challenging compared to depleted natural gas reservoirs. Therefore, the latter are preferred as storage options for hydrogen/natural gas mixtures [See: Kanaani M, Sedaee B, Asadian-Pakfar M. *Role of Cushion Gas on Underground Hydrogen Storage in Depleted Oil Reservoirs. J Energy Storage* 2022; 45:103783]. Knowledge transfer from underground gas storage (UGS) to underground hydrogen storage (UHS) is possible as both gases (i.e., $CH_4$ and $H_2$) are compressible and can be cyclically stored in geological formations. However, caution and revision of conventional UGS facilities are required due to the unique thermophysical properties of $H_2$, including its high mobility, low molecular weight, high diffusivity, low solubility, low density, high surface tension, and potential biogeochemical effects.

In depleted reservoirs, a few experiences [See: Shi Z, Jessen K, Tsotsis T T. *Impacts of the subsurface storage of natural gas and hydrogen mixtures. Int J Hydrogen Energy* 2020; 45:8757-73; Tarkowski R, Uliasz-Misiak B, Tarkowski P. Storage of hydrogen, natural gas, and carbon dioxide—Geological and legal conditions. Int J Hydrogen Energy 2021; 46:20010-22; and Panfilov M, Gravier G, Fillacier S. *Underground storage of $H_2$ and $H_2$-$CO_2$-$CH_4$ mixtures. ECMOR 2006-10th Eur Conf Math Oil Recover* 2006] and pilot projects (such as sun storage) [See: *RAG Austria. Underground sun.storage* 2017] and Hychico [See: Perez A, Pérez E, Dupraz S, Bolcich J. *Patagonia Wind—Hydrogen Project: Underground Storage and Methanation To cite this version: HAL Id: hal-01317467 Patagonia Wind—Hydrogen Project: Underground Storage and Methanation* 2016]) for storing $H_2$ or its mixture with methane have been conducted. However, there is a lack of thorough understanding of several elements of subsurface storage of $H_2$ and its mixture that describes a depleted gas condition noting the different compositions of natural gas when used as cushion gas. Hence, there remains a need to develop $CH_4$ cushion gas mixtures at different compositions of $H_2$ for large-scale storage under depleted gas conditions via wettability and gas-liquid surface tension measurements relevant to UHS.

In view of the foregoing, it is one objective of the present disclosure to determine the fraction of $H_2$—$CH_4$ gases, appropriately, based on the contact angle, surface tension, and column height for injection and withdrawal. A second objective of the present disclosure is to describe a method of storing hydrogen ($H_2$) gas in a subsurface formation.

SUMMARY

In an exemplary embodiment, a method of storing hydrogen ($H_2$) gas in a subsurface formation is described. The subsurface formation includes at least one injection well, at least one production well and at least one heat well penetrating the subsurface formation. The method includes injecting a $H_2$-containing fluid stream into the subsurface formation via the at least one injection well to form a storage composition containing a gas-phase mixture, a liquid-phase mixture and a solid matrix. In some embodiments, the gas-phase mixture of the storage composition includes 10 to 90% of $H_2$, 5 to 80% of methane ($CH_4$), 1 to 10% of carbon dioxide ($CO_2$), and 1 to 10% of nitrogen ($N_2$). Each % is based on a total volume of the gas-phase mixture. In some embodiments, the liquid-phase mixture of the storage composition includes at least one water-soluble mineral. In some embodiments, the solid matrix of the storage composition includes clay, shale, slate, and minerals. The method further includes heating the subsurface formation containing the storage composition via the at least one heat well thereby achieving a storage condition and maintaining the storage condition.

In some embodiments, the gas-phase mixture of the storage composition includes 20 to 80% of $H_2$, 10 to 70% of $CH_4$, about 5% of $CO_2$, and about 5% of $N_2$. Each % is based on the total volume of the gas-phase mixture.

In some embodiments, the gas-phase mixture of the storage composition further includes up to 5% of hydrogen sulfide ($H_2S$), based on the total volume of the gas-phase mixture.

In some embodiments, the gas-phase mixture of the storage composition further includes up to 5% of moisture ($H_2O$), based on the total volume of the gas-phase mixture.

In some embodiments, the subsurface formation includes one of a hydrocarbon-containing reservoir, a natural gas storage space, a carbon sequestration reservoir, an aquifer, a geothermal reservoir, and an in-situ leachable ore deposit.

In some embodiments, the subsurface formation includes a rock material obtained from at least one shale selected from the group consisting of Eagle ford shale, Wolfcamp shale, Posidonia shale, Wellington shale, and Mancos shale.

In some embodiments, the rock material includes one or more of Bentheimer sandstone, Berea sandstone, Vosges sandstone, quartz, borosilicate glass, basalt, shale, calcite, granite, dolomite, gypsum, anhydrite, mica, kaolinite, illite, montmorillonite, and coal.

In some embodiments, the at least one water-soluble mineral includes one or more of sodium bicarbonate, sodium carbonate, sodium chloride, potassium bicarbonate, potassium carbonate, and potassium chloride.

In some embodiments, the at least one water-soluble mineral is present in the liquid-phase mixture at a concentration of 0.1 to 30 wt. % based on a total weight of the liquid-phase mixture.

In some embodiments, the at least one water-soluble mineral is sodium chloride. In some embodiments, the sodium chloride is present in the liquid-phase mixture at a concentration of 2 to 20 wt. % based on a total weight of the liquid-phase mixture.

In some embodiments, the solid matrix of the storage composition further includes silicate, argillite, quartz, sandstone, gypsum, conglomerate, basalt, feldspar, mica, granite, granodiorite, diorite, calcite, kaolinite, illite, montmorillonite, and sand.

In some embodiments, the storage condition has a temperature in a range of 20 to 80 degree Celsius (° C.) in the subsurface formation.

In some embodiments, the storage condition has a water contact angle of 15 to 60 degrees (°) under a pressure of 500 to 4000 pound-force per square inch (psi) in the subsurface formation.

In some embodiments, the storage condition has a surface tension in a range of 40 to 85 dynes per centimeter (dynes/cm) under a pressure of 500 to 4000 psi in the subsurface formation.

In some embodiments, the storage condition has a pressure of 300 to 5000 psi in the subsurface formation.

In some embodiments, the storage condition has a water contact angle in a range of 10 to 50° under a temperature in a range of 30 to 70° C. in the subsurface formation.

In some embodiments, the storage condition has a surface tension in a range of 50 to 80 dynes/cm under a temperature in a range of 30 to 70° C. in the subsurface formation.

In some embodiments, the method has an improved $H_2$ storage capacity. The gas-phase mixture of the storage composition includes about 60% of $H_2$, about 40% of $CH_4$, about 5% of $CO_2$, and about 5% of $N_2$. Each % is based on the total volume of the gas-phase mixture. The liquid-phase mixture includes 2 to 5 wt. % of NaCl based on a total weight of the liquid-phase mixture and the storage condition has a temperature in a range of 30 to 40° C.

In some embodiments, the method further includes withdrawing the gas-phase mixture of the storage composition from the subsurface formation via the at least one production well. The method further includes introducing the gas-phase mixture into a hydrogen purification device comprising a plurality of hydrogen-selective membranes. In some embodiments, the plurality of hydrogen-selective membranes are permeable to hydrogen gas, but are at least substantially impermeable to other components in the gas-phase mixture. The method further includes passing the gas-phase mixture through the plurality of hydrogen-selective membranes in the hydrogen purification device thereby allowing hydrogen gas to pass through the hydrogen-selective membrane and rejecting other components in the gas-phase mixture to form a residue composition. The method further includes collecting the hydrogen gas after passing and recycling the residue composition.

In some embodiments, the plurality of hydrogen-selective membranes in the hydrogen purification device are arranged in parallel. Each membrane of the plurality of hydrogen-selective membranes is placed in a plane perpendicular to the direction of the gas-phase mixture flow in the hydrogen purification device.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1 is a schematic flow chart of a method of storing hydrogen ($H_2$) in a subsurface formation, according to certain embodiments;

FIG. 4A is a schematic representation of the Wilhelmy plate method used for measuring surface tension (ST) and interfacial tension (IFT), according to certain embodiments;

FIG. 4B is a schematic representation of the maximum bubble pressure method used for measuring the ST and the IFT, according to certain embodiments;

FIG. 4C is a schematic representation of the spinning drop method used for measuring the ST and the IFT, according to certain embodiments;

FIG. 4D is a schematic representation of the Du Noüy ring method used for measuring the ST and the IFT, according to certain embodiments;

FIG. 4E is a schematic representation of the capillary rise method used for measuring the ST and the IFT, according to certain embodiments;

FIG. 4F schematic representation of the pendant drop method used for measuring the ST and the IFT, according to certain embodiments;

DETAILED DESCRIPTION

Figure 2:
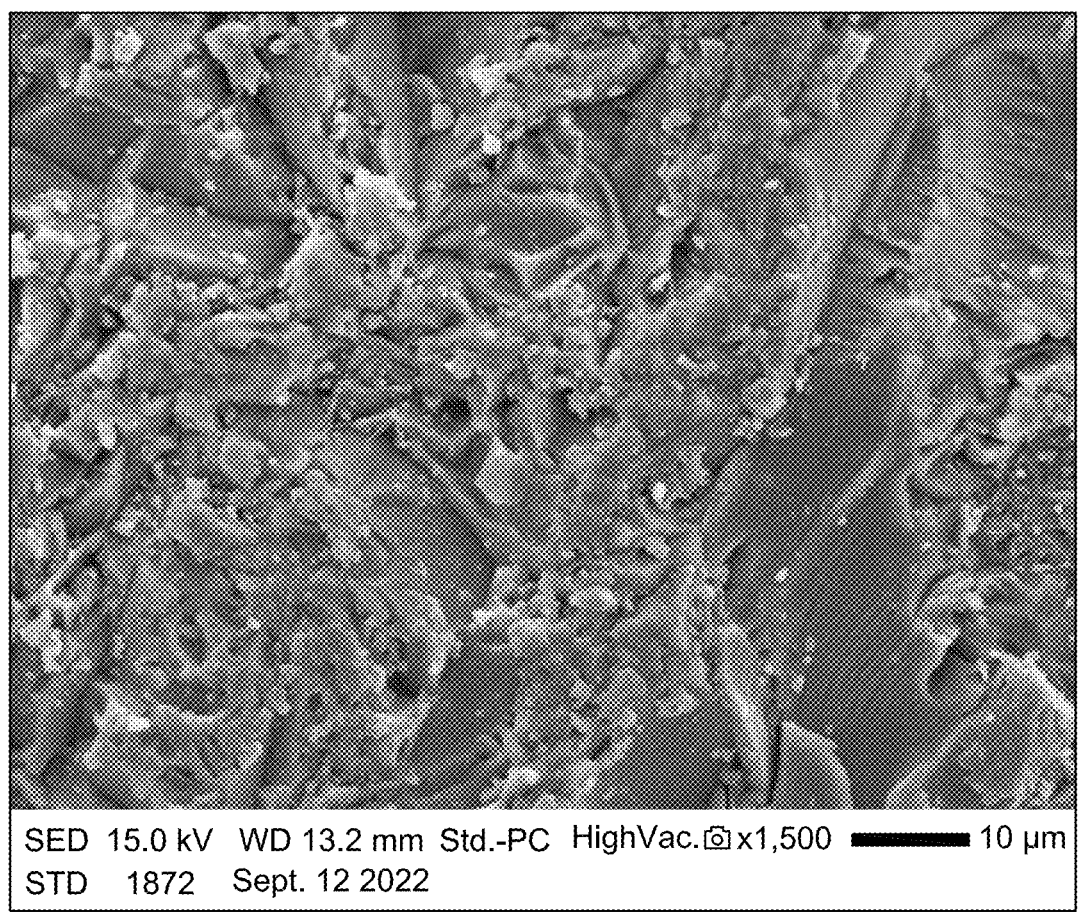
FIG. 2 is a scanning electron microscope (SEM) image of pristine quartz, according to certain embodiments.

In the drawings, reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of the present disclosure are directed towards a method for storing hydrogen ($H_2$) in depleted gas reservoirs and improving hydrogen ($H_2$) geo-storage capacity. Particularly, the role of methane ($CH_4$) as a cushion gas for hydrogen storage in depleted gas reservoirs is disclosed. Further, an effect of $CH_4$—$H_2$ mixture in the presence of cushion gases such as carbon dioxide ($CO_2$) and nitrogen ($N_2$) under different conditions for $H_2$ storage is disclosed in the present disclosure.

Referring to FIG. 1, a schematic flow diagram of a method 100 of storing hydrogen ($H_2$) gas in a subsurface formation. The subsurface formation includes at least an injection well configured to place oil and gas production waste, such as brine, into porous rock formation for storage. Generally, the injection well is drilled thousands of feet into the earth to deposit injection fluids into the porous rock formation, and thereby, the injection well does not deposit production waste into subsurface freshwater reservoirs. The production waste is further stored in the injection well during the oil and gas extraction process. The subsurface formation further includes at least one production well configured to extract oil or gas from the subsurface during the oil and gas extraction process. The production well is also drilled thousands of feet into the earth directly into oil or gas-rich deposits contained in underground formations. During the oil and gas extraction process, hydraulic fracturing is used to bring the oil or gas to the surface. Hydraulic fracturing is defined as a method in which a mixture of water, sand, and chemicals called "brine" are injected at high pressure through the injection well to fracture the rock, which then releases the oil or natural gas and allows it to flow to the ground surface. The subsurface formation further includes at least one heat well configured to heat the subsurface formation containing storage composition. As used herein, the term "heating well" generally refers to a vertical pipe or casing that is used to circulate heated fluid, e.g., hot water or steam, into an oil reservoir. In the present disclosure, the heating well can heat up the storage composition in the reservoir after injecting the $H_2$-containing fluid stream. The viscosity of the gas-phase mixture, and the liquid-phase mixture of the storage composition may be reduced after the heating, making it easier to pump out of the well.

In some embodiments, the heating well is in the form of a closed-loop pipeline having an aboveground loop part, and an underground loop part. The aboveground loop part is in thermal communication with a heat pump supplied by at least one energy source selected from the group consisting of natural gas, electricity, diesel fuel, and solar energy. The heat pump may be monitored and controlled by a computer system to ensure that a desired temperature for the storage composition in the subsurface formation is achieved. In some further embodiments, the underground loop part is extended into the central cavity of the subsurface formation and is in a helix shape that allows substantial contact with the gas-phase mixture, and the liquid-phase mixture of the storage composition. In some more preferred embodiments, the underground loop part is in heat communication with the gas-phase mixture, and the liquid-phase mixture of the storage composition.

In yet some other embodiments, the underground loop part of the heating well may be located around the subsurface formation and is surrounded by layers of rock and soil. The underground loop part is drilled deep into the ground and is equipped with a series of perforations or slots, known as a perforated casing, that allow the heated fluid to flow into the surrounding rock and heat up the subsurface formation surrounded by the underground loop part.

In some embodiments, the subsurface formation includes one of a hydrocarbon-containing reservoir, a natural gas storage space, a carbon sequestration reservoir, an aquifer, a geothermal reservoir, and an in-situ leachable ore deposit. In some embodiments, the subsurface formation includes a rock material obtained from at least one shale selected from the group consisting of Eagle ford shale, Wolfcamp shale, Posidonia shale, Wellington shale, and Mancos shale. The rock material includes one or more of Bentheimer sandstone, Berea sandstone, Vosges sandstone, quartz, borosilicate glass, basalt, shale, calcite, granite, dolomite, gypsum, anhydrite, mica, kaolinite, illite, montmorillonite, and coal.

The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes injecting a $H_2$-containing fluid stream into the subsurface formation via the injection well. The $H_2$-containing fluid stream is further stored in the injection well to form a storage composition containing a gas-phase mixture, a liquid-phase mixture, and a solid matrix. The liquid-phase mixture of the storage composition includes at least one water-soluble mineral. The water-soluble mineral includes one or more of sodium bicarbonate, sodium carbonate, sodium chloride, potassium bicarbonate, potassium carbonate, and potassium chloride. Further, the water-soluble mineral is present in the liquid-phase mixture at a concentration of 0.1 to 30 wt. % based on the total weight of the liquid-phase mixture, preferably 1 to 25 wt. %, preferably 5 to 20 wt. %, or even more preferably 10 to 15 wt. % based on the total weight of the liquid-phase mixture. In some embodiments, the water-soluble mineral is sodium chloride which is present in the liquid-phase mixture at a concentration of 2 to 20 wt. % based on the total weight of the liquid-phase mixture, preferably 5 to 15 wt. %, or even more preferably about 10 wt. % based on the total weight of the liquid-phase mixture. In some further preferred embodiments, the liquid-phase mixture may further include a crude oil selected from the group consisting of Arabian Heavy oil, Arabian Light oil, Gulf crudes, and Brent crude. As used herein, the term "crude oil" generally refers to oil that has undergone some pre-treatment such as water-oil separation; and/or oil-gas separation; and/or desalting; and/or a stabilized mixture.

The solid matrix of the storage composition includes clay, shale, slate, and minerals. In some embodiments, the solid matrix of the storage composition includes silicate, argillite, quartz, sandstone, gypsum, conglomerate, basalt, feldspar, mica, granite, granodiorite, diorite, calcite, kaolinite, illite, montmorillonite, and sand.

The gas-phase mixture of the storage composition includes hydrogen ($H_2$), methane ($CH_4$), carbon dioxide ($CO_2$), and nitrogen ($N_2$). According to the present disclosure, a total volume of gas-phase mixture includes 10 to 90% of $H_2$, 5 to 80% of $CH_4$, 1 to 10% of $CO_2$, and 1 to 10% of $N_2$. In some embodiments, the gas-phase mixture of the storage composition includes 20 to 80% of $H_2$, 10 to 70% of $CH_4$, about 5% of $CO_2$, and about 5% of $N_2$. Each % is defined based on the total volume of the gas-phase mixture. In some embodiments, the gas-phase mixture of the storage composition includes up to 5% of hydrogen sulfide ($H_2S$), based on the total volume of the gas-phase mixture. In some embodiments, the gas-phase mixture of the storage composition includes up to 5% of moisture ($H_2O$), based on the total volume of the gas-phase mixture.

In some embodiments, the $H_2$-containing fluid stream may be a $H_2$-containing gas mixture containing hydrogen ($H_2$), methane ($CH_4$), carbon dioxide ($CO_2$), and nitrogen ($N_2$). In some further embodiments, a total volume of the $H_2$-containing gas mixture includes 10 to 90% of $H_2$, 5 to 80% of $CH_4$, 1 to 10% of $CO_2$, and 1 to 10% of $N_2$. In some preferred embodiments, the $H_2$-containing gas mixture includes 20 to 80% of $H_2$, 10 to 70% of $CH_4$, about 5% of $CO_2$, and about 5% of $N_2$. Each % is defined based on the total volume of the $H_2$-containing gas mixture. In some more preferred embodiments, the $H_2$-containing gas mixture further includes up to 5% of hydrogen sulfide ($H_2S$), based on the total volume of the $H_2$-containing gas mixture. In some most preferred embodiments, the $H_2$-containing gas mixture further includes up to 5% of moisture ($H_2O$), based on the total volume of the $H_2$-containing gas mixture. In some embodiments, the liquid-phase mixture and the solid matrix are present in the subsurface formation before injecting the $H_2$-containing gas mixture. In some further embodiments, the liquid-phase mixture may contain a water-soluble mineral having a concentration of 2 to 5 wt. % of mineral based on the total weight of the liquid-phase mixture.

In some embodiments, the $H_2$-containing fluid stream contains the $H_2$-containing gas mixture and a NaCl solution. The $H_2$-containing gas mixture includes hydrogen ($H_2$), methane ($CH_4$), carbon dioxide ($CO_2$), and nitrogen ($N_2$). In some embodiments, the $H_2$-containing gas mixture present in the $H_2$-containing fluid stream includes 10 to 90% of $H_2$, 5 to 80% of $CH_4$, 1 to 10% of $CO_2$, and 1 to 10% of $N_2$ based on a total volume of the $H_2$-containing fluid stream. In some preferred embodiments, the $H_2$-containing gas mixture present in the $H_2$-containing fluid stream includes 20 to 80% of $H_2$, 10 to 70% of $CH_4$, about 5% of $CO_2$, and about 5% of $N_2$. Each % is defined based on the total volume of the $H_2$-containing fluid stream. In some more preferred embodiments, the $H_2$-containing gas mixture further includes up to 5% of hydrogen sulfide ($H_2S$), based on the total volume of the $H_2$-containing fluid stream. In some most preferred embodiments, the $H_2$-containing gas mixture further includes up to 5% of moisture ($H_2O$), based on the total volume of the $H_2$-containing fluid stream. In some embodiments, the NaCl solution has a concentration of 0.5 to 10 wt. % by weight of the NaCl solution, preferably 1 to 8 wt. %, or even more preferably 2 to 5 wt. % by weight of the NaCl solution. In some embodiments, the NaCl solution is present in the $H_2$-containing fluid stream at a concentration of no more than 10%, preferably no more than 5%, preferably no more than 3%, or even more preferably no more than 1% based on the total volume of the $H_2$-containing fluid stream. Other ranges are also possible. In some embodiments, the density of the $H_2$-containing gas mixture is no more than 1% of the density of the NaCl solution, preferably no more than 0.5%, or even more preferably no more than 0.1% based on the density of the NaCl solution.

At step 104, the method 100 includes heating the subsurface formation containing the storage composition via the at least one heat well, thereby achieving a storage condition and maintaining the storage condition. The storage condition has a temperature in a range of 20 to 80 degree Celsius (° C.), preferably 30 to 70° C., preferably 40 to 60° C., or even more preferably about 50° C. In some embodiments, the storage condition has a pressure of 300 to 5000 psi, preferably 1000 to 4500 psi, preferably 1500 to 4000 psi, preferably 2000 to 3500, or even more preferably 2500 to 3000. Other ranges are also possible.

According to the present disclosure, the method 100 helps to achieve an improved $H_2$ storage capacity. As such, the gas-phase mixture of the storage composition includes about 60% of $H_2$, about 40% of $CH_4$, about 5% of $CO_2$, and about 5% of $N_2$, in which each % is based on the total volume of the gas-phase mixture. The liquid-phase mixture includes 2 to 5 wt. % of NaCl based on the total weight of the liquid-phase mixture and the storage condition has a temperature in a range of 30 to 40° C.

The method 100 further includes withdrawing the gas-phase mixture of the storage composition from the subsurface formation via the production well and introducing the gas-phase mixture into a hydrogen purification device including one or more hydrogen-selective membranes. The hydrogen-selective membranes are permeable to hydrogen gas, but are at least substantially impermeable to other components in the gas-phase mixture.

In some embodiments, the plurality of hydrogen-selective membranes in the hydrogen purification device is arranged in parallel, and each membrane of the plurality of hydrogen-selective membranes is placed in a plane perpendicular to a direction of the gas-phase mixture flow in the hydrogen purification device. The method 100 further includes passing the gas-phase mixture through the plurality of hydrogen-selective membranes in the hydrogen purification device thereby allowing hydrogen gas to pass through the hydrogen-selective membrane and rejecting other components in the gas-phase mixture to form a residue composition. The method 100 further includes collecting the hydrogen gas after passing and recycling the residue composition.

Wettability (via a contact angle (CA)) of gas mixtures ($CH_4$—$H_2$—$CO_2$—$N_2$)/brine/quartz at various pressures (500 psi up to 4000 psi) and temperature (30° C., 40° C., 50° C., 60° C., and 70° C.) for different reservoir salinities (2 wt. %, 5 wt. %, 10 wt. %, 15 wt. %, and 20 wt. %) is analyzed using a sessile drop set up. Wettability is defined as the assessment of rock preference towards fluid surfaces, which is an important factor for determining residual saturation [See: Al-Yaseri A, Esteban L, Giwelli A, Sarout J, Lebedev M, Sarmadivaleh M. *Initial and residual trapping of hydrogen and nitrogen in Fontainebleau sandstone using nuclear magnetic resonance core flooding. Int J Hydrogen Energy* 2022; 47:22482-94, which is incorporated herein by reference in its entirety], capillary pressure [See: Hashemi L, Blunt M, Hajibeygi H. *Pore-scale modelling and sensitivity analyses of hydrogen-brine multiphase flow in geological porous media. Sci Rep* 2021; 11:1-13; and Boon M, Hajibeygi H. *Experimental characterization of $H_2$/water multiphase flow in heterogeneous sandstone rock at the core scale relevant for underground hydrogen storage (UHS). Sci Rep* 2022:1-2, each of which is incorporated herein by reference in their entirety], and relative permeability functions [See: Rezaei A, Hassanpouryouzband A, Molnar I, Derikvand Z, Haszeldine R S, Edlmann K. *Relative Permeability of Hydrogen and Aqueous Brines in Sandstones and Carbonates at Reservoir Conditions. Geophys Res Lett* 2022; 49, which is incorporated herein by reference in its entirety] whereas interfacial tension (IFT) is a phenomenon responsible for the difference in energy between molecules at a fluid interface when compared to their bulk counterparts. IFT also helps to determine the stability of the two-phase interface, thus, the two-phase interface becomes easier to break when IFT is reduced [See: Yekta A E, Manceau J C, Gaboreau S, Pichavant M, Audigane P. *Determination of Hydrogen-Water Relative Permeability and Capillary Pressure in Sandstone: Application to Underground Hydrogen Injection in Sedimentary Formations. Transp Porous Media* 2018; 122:333-56, which is incorporated herein by reference in its entirety]. Additionally, extensive surface tension (ST) measurement between the different gas mixtures/brine is performed via the pendant drop technique to establish relevant data for geo-storage. Furthermore, column heights (due to the capillary seal and both capillary seal and reservoir rocks) were estimated based on CA and ST data observed.

Referring to FIGS. 6A-E, in some embodiments, when the reservoir has a salinity of 2 to 20% based on the total weight of the salt solution, the method 100 has a water contact angle of 15 to 60°, preferably 20 to 45°, or even more preferably 25 to 30° under a pressure of 500 to 4000 psi. Other ranges are also possible.

Referring to FIGS. 7A-E, in some embodiments, when the reservoir has a temperature of 30 to 70° C., the method 100 has a water contact angle of 15 to 60°, preferably 20 to 50°, or even more preferably 25 to 40° under a pressure of 500 to 4000 psi. Other ranges are also possible.

Referring to FIGS. 8A-E, in some embodiments, when the reservoir has a salinity of 2 to 20% based on the total weight of the salt solution, the method 100 has a surface tension in a range of 40 to 85 dynes per centimeter (dynes/cm), preferably 50 to 70 dynes/cm, or even more preferably about 60 dynes/cm, under a pressure of 500 to 4000 psi.

Referring to FIGS. 9A-E, in some embodiments, when the reservoir has a temperature of 30 to 70° C., the method 100 has a surface tension in a range of 40 to 85 dynes per centimeter (dynes/cm), preferably 45 to 75 dynes/cm, or even more preferably 50 to 70 dynes/cm, under a pressure of 500 to 4000 psi.

EXAMPLES

The following examples demonstrate a method of storing hydrogen ($H_2$) gas in a subsurface formation as described herein. The examples are provided solely for illustration and are not to be construed as limitations of the present disclosure, as many variations thereof are possible without departing from the spirit and scope of the present disclosure.

Example 1: Methodology

The process of gas storage in geological formations is influenced by gas/liquid/rock interactions as IFT and wettability strongly affect the gas injection and withdrawal cycles. The equation [See: Blunt M J. *Multiphase Flow in Permeable Media: A Pore Scale Perspective*. Cambridge University Press; 2017, which is incorporated herein by reference in its entirety] is used to relate the interactions (interfacial tension, capillarity, and wettability) as shown in Eq. (1):

$$P_c = P_{nw} - P_w = \frac{2\gamma \cos\theta}{r} \quad \text{Eq. (1)}$$

Where $P_c$ is the capillary pressure, $P_{nw}$ and $P_w$ are the nonwetting and wetting phase pressures, respectively, $\gamma$, is the interfacial tension between the aqueous phase and the $H_2$-rich phase, r is an effective pore radius corresponding to the narrowest pore throat along the entire flow path, and $\theta$ is the water contact angle related to the reservoir wettability. The capillary pressure can be positive or negative, depending on the wetting phase, i.e., whether the water contact angle is smaller or greater than 90°.

Capillary trapping occurs when $H_2$ is immobilized in the rock pores by capillary forces, which depends on the IFT between the gas and the aqueous phase (brine), wettability of the rock, and the pore size distribution. $H_2$ containment security reduces as the rock surface becomes $H_2$-wet, resulting in premature gas leakage from rock pores, causing a substantial decrease in residual (capillary) and structural trapping abilities of the storage rock or caprock. Some experimental works on porous media (aquifer and depleted reservoirs) are concentrated on depleted gas conditions [See: Hashemi L, Boon M, Glerum W, Farajzadeh R, Hajibeygi H. *A comparative study for $H_2$-$CH_4$ mixture wettability in sandstone porous rocks relevant to underground hydrogen storage. Adv Water Resour* 2022; 163:104165, which is incorporated herein by reference in its entirety] where a mixture of gases such as $CH_4$, $N_2$, and $CO_2$ exist; which are often used as cushion gas [See: Hassanpouryouzband A, Joonaki E, Edlmann K, Heinemann N, Yang J. *Thermodynamic and transport properties of hydrogen-containing streams. Sci Data* 2020; 7:1-14; Panfilov M, Gravier G, Fillacier S. *Underground storage of $H_2$ and $H_2$-$CO_2$-$CH_4$ mixtures. ECMOR* 2006—$10^{th}$ *Eur Conf Math Oil Recover* 2006, each of which is incorporated herein by reference in their entirety]. The cushion gas requirement for the depleted gas field is minimal (as compared to the aquifer), thus, making it less expensive than the aquifer storage medium. Besides, depleted gas reservoirs currently serve as the most pragmatic option for storing $H_2$ as natural gas in underground gas storage (UGS) and $H_2$ in underground hydrogen storage (UHS), and both undergo a cyclic injection/withdrawal process as compared to $CO_2$ in carbon capture and storage (CCS).

The work by Hashemi et al. reported the wettability status of $H_2$ and $CH_4$ gas mixture using the captive bubble technique on sandstone (Bentheimer) for a range of pressures (20-100 bar), temperatures (30° C. and, 50° C.), and two salinities (pure water, 5000 ppm). However, the effect of other sister gases, such as $CO_2$ and $N_2$, often present in natural gas, was not considered. Furthermore, depleted gas reservoirs represent a larger pressure extent beyond. Therefore, according to the present disclosure, the effect of $CH_4$ and $H_2$ mixture is investigated in the presence of $CO_2$ and $N_2$ at relevant UHS conditions [See: Hashemi L, Boon M, Glerum W, Farajzadeh R, Hajibeygi H. *A comparative study for $H_2$-$CH_4$ mixture wettability in sandstone porous rocks relevant to underground hydrogen storage. Adv Water Resour* 2022; 163:104165; and Hashemi L, Glerum W, farajzadeh R, Hajibeygi H. *Contact angle measurement for hydrogen/brine/sandstone system using captive-bubble method relevant for underground hydrogen storage. Adv Water Resour* 2021; 154:103964, each of which is incorporated herein by reference in their entirety] using a sessile drop to represent a fair assessment of depleted natural gas reservoir. Additionally, the gas brine surface tension (via pendent drop) was also measured at different ranges of reservoir pressures (500 to 4000 psi), temperatures (30 to 70° C.), and salinities (2 to 20 wt. %).

The materials, and sample characterization, as well as the adopted sessile and pendant drop methods used for contact angle (CA) and gas brine surface tension (ST) measurement, respectively, are described in detail below.

Example 2: Materials

Pristine quartz substrate (98% pure) was chosen as a proxy for sandstone formation (as sandstone mainly consists of quartz minerals). Sodium chloride (NaCl) (99.99 mol % purity from Sigma Aldrich) was used to prepare the different brine concentrations (2 to 20 wt. %) using lab-based deionized water. The range of salinities was adopted from the work [See: Henkel S, Pudlo D, Werner L, Enzmann F, Reitenbach V, Albrecht D, et al. *Mineral reactions in the geological underground induced by $H_2$ and $CO_2$ injections. Energy Procedia* 2014; 63:8026-35, which is incorporated herein by reference in its entirety] which investigated siliciclastic reservoirs (sandstones and clay/silt caprock) from 25 well sites in Germany and Austria in a depleted gas condition (T=120° C., P=20 MP and formation salinity 35 wt. %). High-purity grade gases ($H_2$:99.99%, $CH_4$:99.99%, $CO_2$:99.99%, and $N_2$:99.99%) supplied by Air Liquide gas company, Saudi Arabia, were used for this experiment. The experimental conditions for the different gas compositions and mixtures are shown in Table 1.

TABLE 1

Experimental conditions for the different gas compositions and mixtures.

| Test Cases | Gas phase mixtures (%) | | | | Salinity (wt. %) | Temperature (° C.) | Pressure (psi) |
| --- | --- | --- | --- | --- | --- | --- | --- |
| | $H_2$ | $CH_4$ | $CO_2$ | $N_2$ | | | |
| Case 1 | 80 | 10 | 5 | 5 | 2, 5, 10, 15, 20 | 30, 40, 50, 60, 70 | 500-4000 |
| Case 2 | 70 | 20 | 5 | 5 | 2, 5, 10, 15, 20 | 30, 40, 50, 60, 70 | 500-4000 |
| Case 3 | 60 | 30 | 5 | 5 | 2, 5, 10, 15, 20 | 30, 40, 50, 60, 70 | 500-4000 |
| Case 4 | 50 | 40 | 5 | 5 | 2, 5, 10, 15, 20 | 30, 40, 50, 60, 70 | 500-4000 |
| Case 5 | 40 | 50 | 5 | 5 | 2, 5, 10, 15, 20 | 30, 40, 50, 60, 70 | 500-4000 |
| Case 6 | 30 | 60 | 5 | 5 | 2, 5, 10, 15, 20 | 30, 40, 50, 60, 70 | 500-4000 |
| Case 7 | 20 | 70 | 5 | 5 | 2, 5, 10, 15, 20 | 30, 40, 50, 60, 70 | 500-4000 |

Example 3: Sample Characterization

Initially, the pristine quartz substrate was cut and smoothed using sandpaper. Thereafter, the smoothened quartz substrates were cleaned only with deionized water to best preserve their surface properties because pore lining materials and trace amounts of natural organics may be present and may influence interfacial phenomena [See: Wang S, Tokunaga T K. *Capillary Pressure-Saturation Relations for Supercritical $CO_2$ and Brine in Limestone/Dolomite Sands: Implications for Geologic Carbon Sequestration in Carbonate Reservoirs. Environ Sci Technol* 2015; 49:7208-17, which is incorporated herein by reference in its entirety]. The sample was then left to dry in an oven at 70° C. for 5 minutes. A surface roughness analyzer was used to assess the roughness, which was expressed in root mean square (RMS) as 373 µm. The SEM image of the pristine quartz is shown in FIG. 2 (which was measured using JCM-7000 NeoScope Benchtop SEM).

Example 4: Contact Angle Measurement

Figure 3:
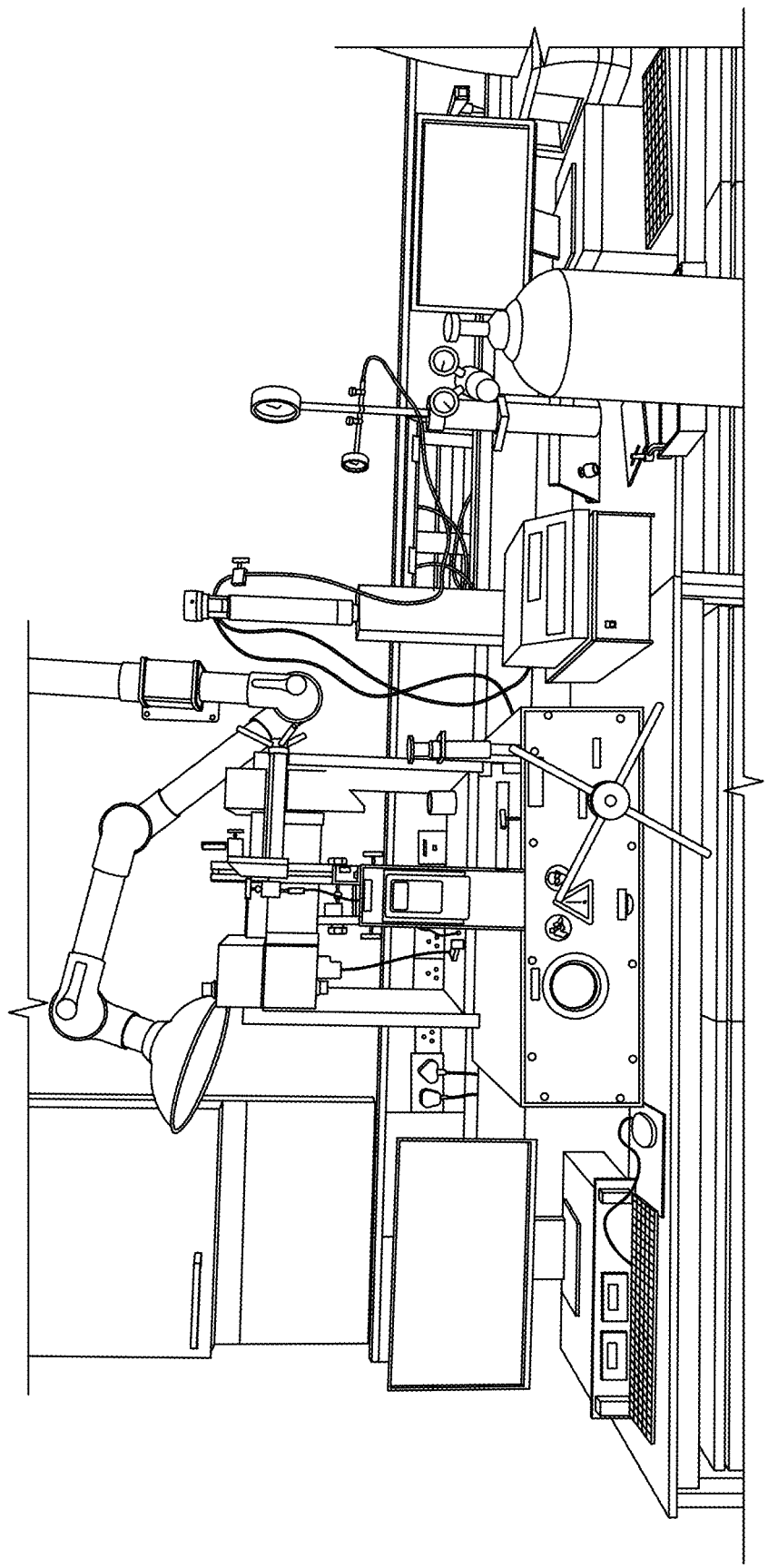
FIG. 3 is a pictorial depiction of the Kruss drop shape analyzer (DSA100) equipment, according to certain embodiments.

Quantitatively, the wetting characteristics of a rock/fluid system can be analyzed using the CA technique. The methodology adopted by the work of Al-Mukainah et al. [See: Al-mukainah H, Al-yaseri A, Yekeen N, Al J. *Wettability of shale brine $H_2$ system and $H_2$-brine interfacial tension for assessment of the sealing capacities of shale formations during underground hydrogen storage. Energy Reports* 2022; 8:8830-43, which is incorporated herein by reference in its entirety], who assessed the sealing capacities of Eagle Ford and Wolf-camp shale formations is used in the present disclosure. While the study of prior reference was limited to 1000 psi as they observed possible $H_2$ reactivity with the shale samples, in the present disclosure, this method is extended by using pristine quartz to annul the possible effect of $H_2$ reactivity, and volatility at high pressure (4000 psi). Additionally, the effect of spreading and diffusion of the brine into the porous hydrophilic substrates often observed when using sessile drop was limited (thus, the reason behind the application of pristine quartz instead of the constitutive sandstone). FIG. 3 shows the pictorial image of the Kruss Drop Shape Analyzer (DSA 100) equipment.

Before sample placement in the high-pressure, high-temperature (HPHT) cell chamber, the HPHT cell's interior, and the flowlines were specifically rinsed with brine, and finally, a different gas mixture (depending on the specific experiment) was used to flush out the HPHT cell's interior. In the first scenario (Test case 1), the desired temperature was achieved by heating the cell to 30° C. before inserting the pristine quartz into the HPHT chamber. Afterward, a manual hand pump was utilized to make a 2 wt. % NaCl brine drop (varied between 17 to 23 µL) via the capillary needle on the substrate before an ISCO pump (500 D, with the precision of 0.001 Mpa) was used for gas mixture injection. The desired pressure was attained by gradually pressurizing the cell with the gas mixtures to achieve dynamic equilibrium. The drop was captured by a high-resolution CCD camera system through pressure-resistant sapphire windows, and the CA was automatically computed by time for at least 25 replicates point and was presented by standard deviation. After the first CA measurement at a specific temperature, CA at different pressure were measured using the same droplet, by gradually pressurizing the HPHT chamber with different gas mixtures. This method practically simulates the realistic UHS condition in a gas reservoir where the injected gas displaces the existing fluids (formation brine and native gas) in the storage medium (reservoir-rock) after which it spreads laterally until a trap/caprock prevents its escape. Besides the modification of the method [See: Al-mukainah H, Al-yaseri A, Yekeen N, Al J. *Wettability of shale-brine-$H_2$ system and $H_2$-brine interfacial tension for assessment of the sealing capacities of shale formations during underground hydrogen storage. Energy Reports* 2022; 8:8830-43, which is incorporated herein by reference in its entirety], the present disclosure the changes in the $H_2$—$CH_4$ gas mixtures (refer to Table 1), while keeping $CO_2$ and $N_2$ constant (native gases) to depict the effect of $CH_4$ as a cushion gas during $H_2$ storage. According to method 100 of the present disclosure, the water contact angle is 15 to 60 degrees (°) under a pressure of 500 to 4000 psi, and the water contact angle is in a range of 10 to 500 under a temperature in a range of 30 to 70° C.

Example 5: Surface Tension Measurement

Several techniques have been proposed to measure IFT/ST as shown in FIG. 4A to FIG. 4F. While these experimental techniques have their features, and qualities, the pendent drop, however, is arguably the simplest (in terms of instrumentation), robustness, and versatility [See: Berry J D, Neeson M J, Dagastine R R, Chan D Y C, Tabor R F. *Measurement of surface and interfacial tension using pendant drop tensiometry. J Colloid Interface Sci* 2015; 454: 226-37, which is incorporated herein by reference in its entirety]. In addition, the image digitization and automation of the axisymmetric drop shape analysis (ADSA) of the drop profiles are based on matching the experimental drop profile from a digitalized image to a series of Laplacian curves with known IFT values. The drop or bubble equatorial diameter, $d_e$, is determined by using the diameter of the capillary tube as a reference. The other required dimension ($d_s$) is calculated by considering a distance from the bottom (or top) equal to $d_e$ and measuring the diameter of the drop or bubble at this height. Once the $d_e$ and $d_s$ are known, the IFT between the adjacent fluids can be calculated by a mathematical approach (Eq. (2)) [See: Drelich J. *Measurement of Interfacial Tension in Fluid-Fluid Systems. Encycl Surf Colloid Sci* 2002:315266, which is incorporated herein by reference in its entirety]:

$$\gamma = \frac{\Delta\rho g(d_e)^2}{H \times 10^3} \qquad \text{Eq. (2)}$$

Herein, $\gamma$ is the ST in dynes/cm (mN/m), $d_e$ (equatorial diameter) is in mm, g is the gravitational acceleration in m/s$^2$, $\Delta\rho$ is the density difference between the two phases in kg/m$^3$ and H is the shape-dependent parameter: expressed as a dimensionless shape factor determined from correlation reported by [See: Juza J. *The pendant drop method of surface tension measurement: Equation interpolating the shape factor tables for several selected planes. Czechoslov J Phys* 1997; 47:351-357, which is incorporated herein by reference in its entirety] expressed as $$\frac{d_s}{d_e}.$$

In the present disclosure, the gas mixture ($CH_4$—$H_2$—$CO_2$—$N_2$)/brine ST was measured using the pendant drop and Young-Laplace fitting method. Similar to the CA methodology discussed above, the HPHT chamber was heated to the required temperature (30° C.), and a pendent of brine (2 wt. %) was formed at the capillary needle tip (ranging between 14 to 18 μL). Afterward, the gas mixtures were injected into the cell with the same high-precision ISCO pump until the desired pressure was obtained at each set temperature. The dynamic ST continued to reduce with time until the drop became saturated with gas mixtures because of the diffusion process. In the end, the equilibrium ST was measured when no change in the ST values was noticed automatically by the data acquisition software (for 25 replicates data points), and the result was presented based on a standard deviation of ±5 dynes/cm. According to the method of the present disclosure, the surface tension is in a range of 40 to 85 dynes per centimeter (dynes/cm) under a pressure of 500 to 4000 psi, and the surface tension is in a range of 50 to 80 dynes/cm under a temperature in a range of 30 to 70° C.

Example 6: Column Height

The first mechanism responsible for the containment of the injected gas and its potential storage capacity is structural trapping [See: glauer S, Pentland C H, Busch A. *CO$_2$ wettability of seal and reservoir rocks and the implications for carbon geo-sequestration. Water Resour Res* 2015; 51:729-74; and Iglauer S. *Optimum geological storage depths for structural H$_2$ geo-storage. J. Pet. Sci. Eng* 2022; 212:109498, each of which is incorporated herein by reference in their entirety]. This mechanism keeps the buoyant $H_2$ in the subsurface from rising by capillary forces. However, while the concept of UGS and UHS operations often require multiple injections and withdrawal cycles based on the demand, the trapped residual gas saturation must therefore be minimized to reduce the effect of the splitting of the gas plume during withdrawal so that larger gas clusters can be easily re-mobilized. To achieve this, the buoyancy pressure must be greater than the capillary entry pressure (Pce) to overcome the counteracting capillary forces. But first, the amount of injected gas in prospect needs to be determined to effectively predict the loss in the event both the capillary and buoyancy pressures are at equilibrium.

The column height estimation in UHS widely considers the effect of seal rock potential [See: Hosseini M, Ali M, Fahimpour J, Keshavarz A, Iglauer S. *Basalt-H$_2$-brine wettability at geo-storage conditions: Implication for hydrogen storage in basaltic formations. J Energy Storage* 2022; 52:104745; and Al-Yaseri A, Yekeen N, Mahmoud M, Kakati A, Xie Q, Giwelli A. *Thermodynamic characterization of H$_2$-brine-shale wettability: Implications for hydrogen storage at subsurface. Int J Hydrogen Energy* 2022; 47:22510-21, each of which is incorporated herein by reference in their entirety] using Eq. (3), whereas it is argued that such subsurface storages need to consider the capillary contribution from reservoir rock to account for the fair assessment of the structural trapping mechanisms.

$$H_{seal} = \frac{2\gamma\cos\theta}{g(\rho_b - \rho_{gmix})r_{seal}} \qquad \text{Eq. (3)}$$

In the context of carbon geo storage, the reference [See: Ringrose P. *How to Store CO$_2$ Underground: Insights from early-mover CCS Projects.* 2020; and Thanasaksukthawee V, Santha N, Saenton S, Tippayawong N, Jaroonpattanapong P, Foroozesh J, et al. *Relative CO$_2$Column Height for CO$_2$Geological Storage: A Non-Negligible Contribution from Reservoir Rock Characteristics. Energy and Fuels* 2022; 36:3727-36, each of which is incorporated herein by reference in their entirety], showed that such an approach with reservoir rock taken into consideration can justify natural accumulations of $CO_2$ beneath the subsurface as it balances the relative capillary contribution from both seal and reservoir rocks. For a shale sample overlying the reservoir rock (pristine quartz in the present disclosure) where the different gas mixture formulations are injected, Eq. (4), which is the relative $H_2$ column height for both the seal and storage rocks, can thus be used to estimate the potential structural effect of the individual gas mixtures (i.e., Test cases).

$$H_{seal-reservoir} = \frac{2\gamma\cos\theta}{g(\rho_b - \rho_{gmix})} \times \left(\frac{1}{r_{seal}} - \frac{1}{r_{reservoir}}\right) \qquad \text{Eq. (4)}$$

Figure 5B:
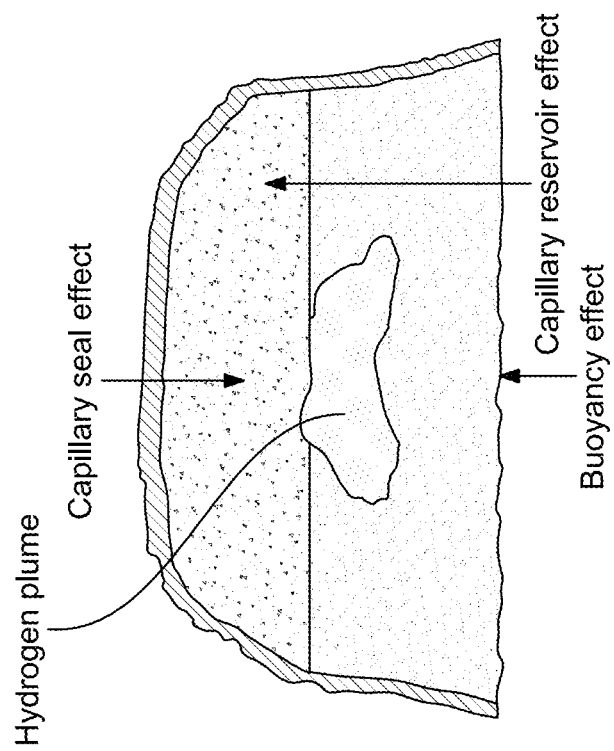
FIG. 5B is a schematic representation for structural trapping with force balance between buoyancy and capillary for a seal-reservoir column height estimation, according to certain embodiments.
Figure 5A:
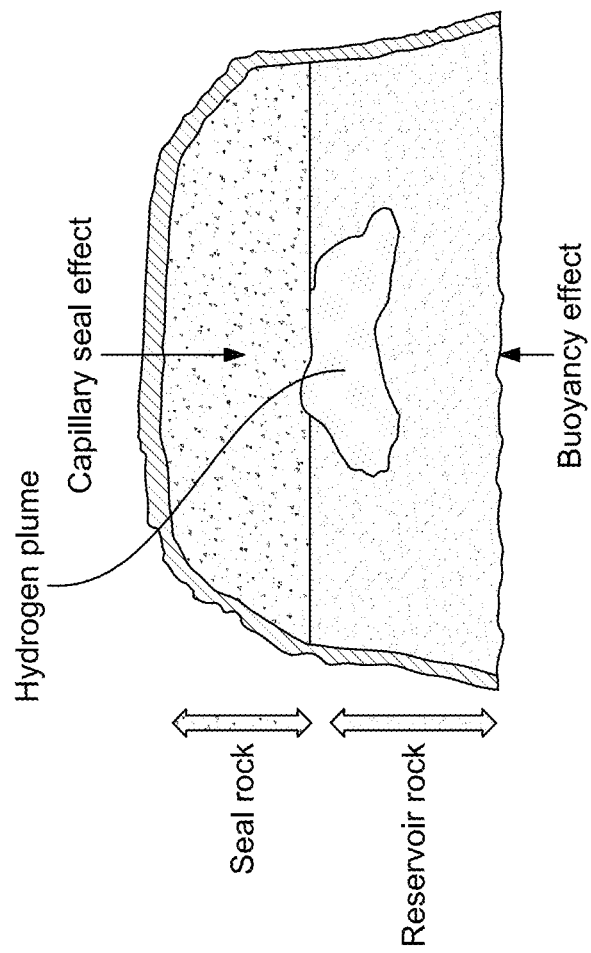
FIG. 5A is a schematic representation for structural trapping with force balance between buoyancy and capillary for a seal column height estimation, according to certain embodiments.
Figure 6A:
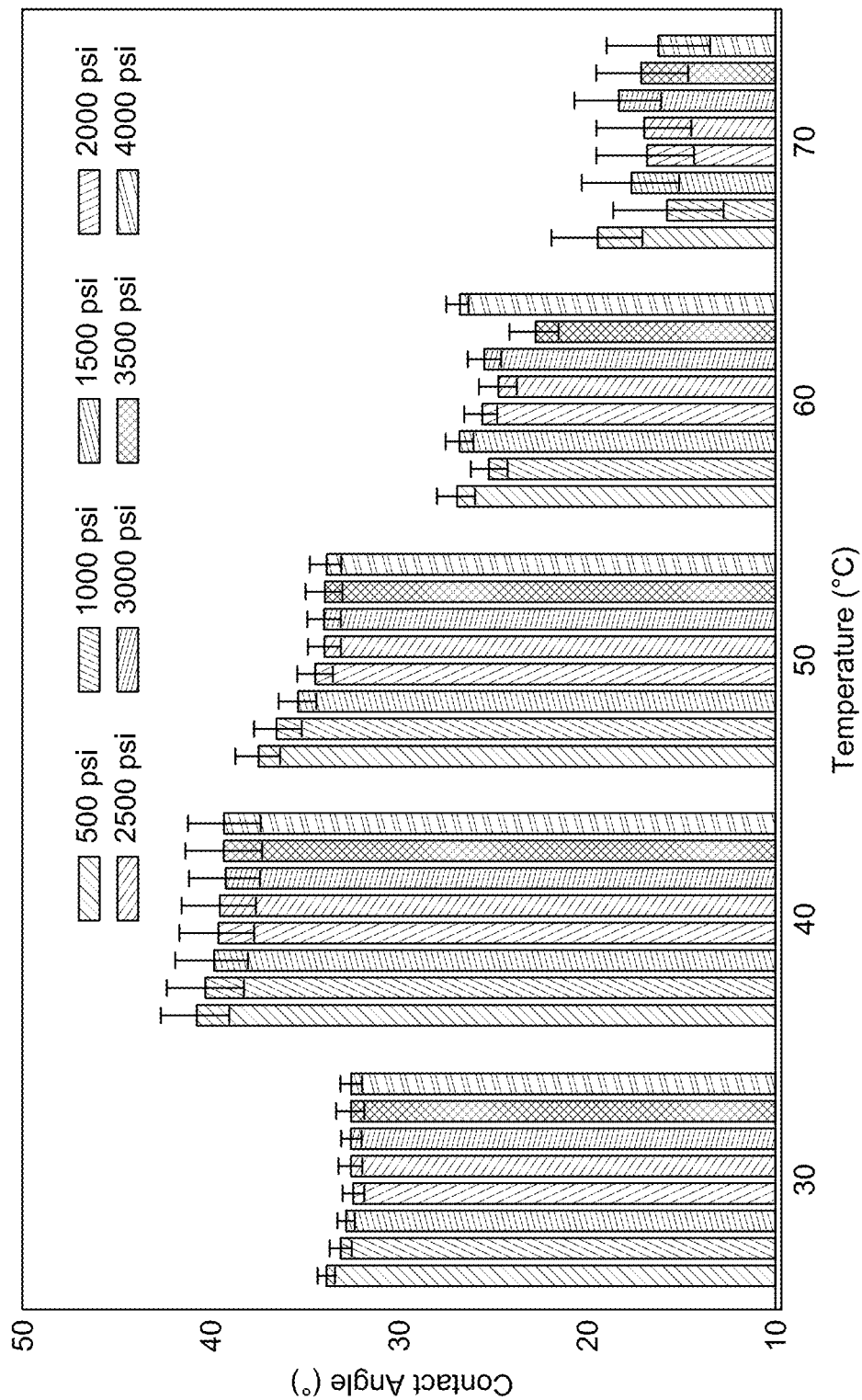
FIG. 6A is a schematic plot depicting an effect of pressure (500 to 4000 psi) on the measured contact angle (CA) for various underground hydrogen storage (UHS) conditions of temperature (30 to 70° C.) at 2 wt. % NaCl brine salinities for test case 1 representing 80% $H_2$-10% $CH_4$-5% $CO_2$-5% $N_2$, according to certain embodiments.
Figure 6B:
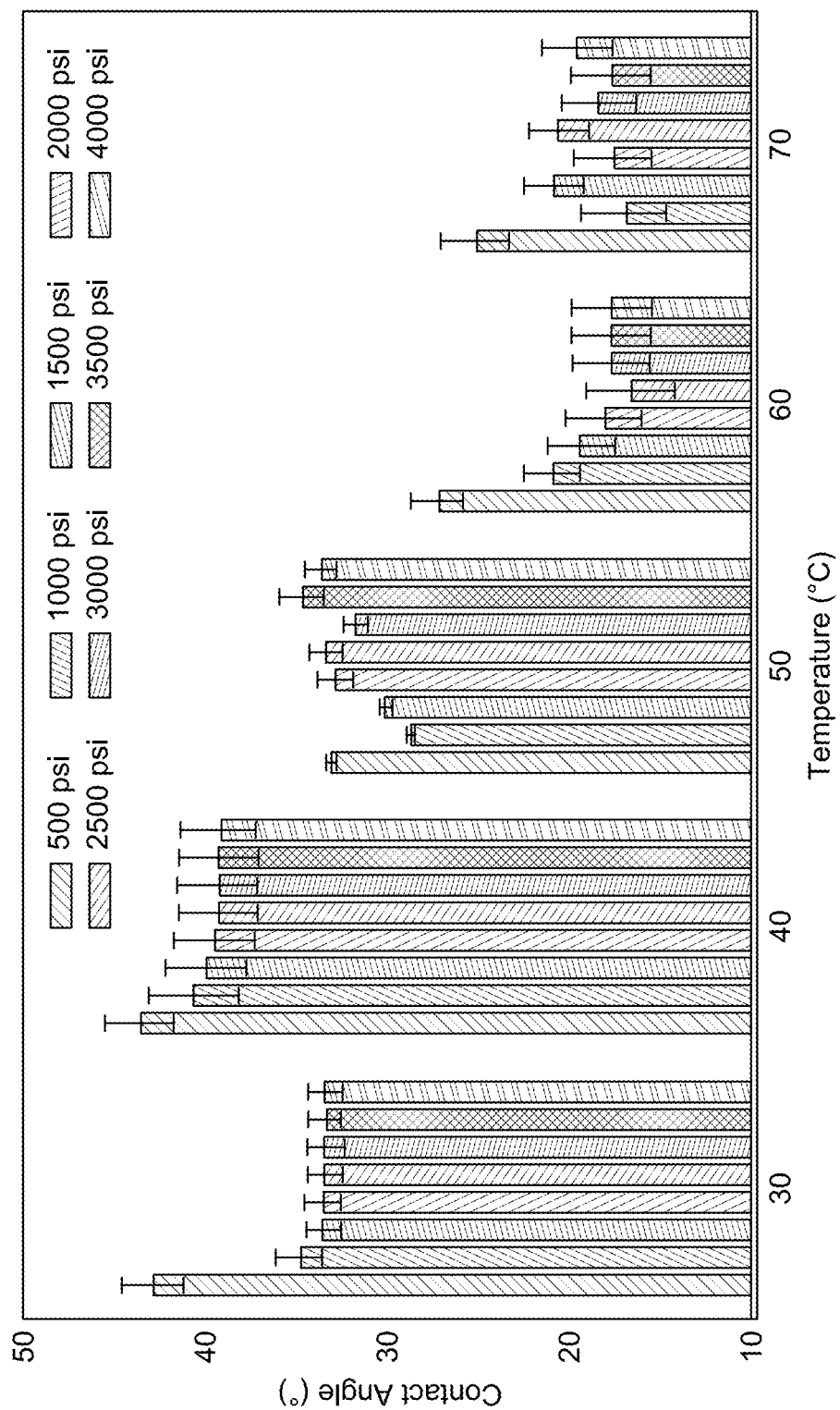
FIG. 6B is a schematic plot depicting an effect of pressure (500 to 4000 psi) on the measured CA for various UHS conditions of temperature (30 to 70° C.) at 5 wt. % NaCl brine salinities for the test case 1, according to certain embodiments.
Figure 6C:
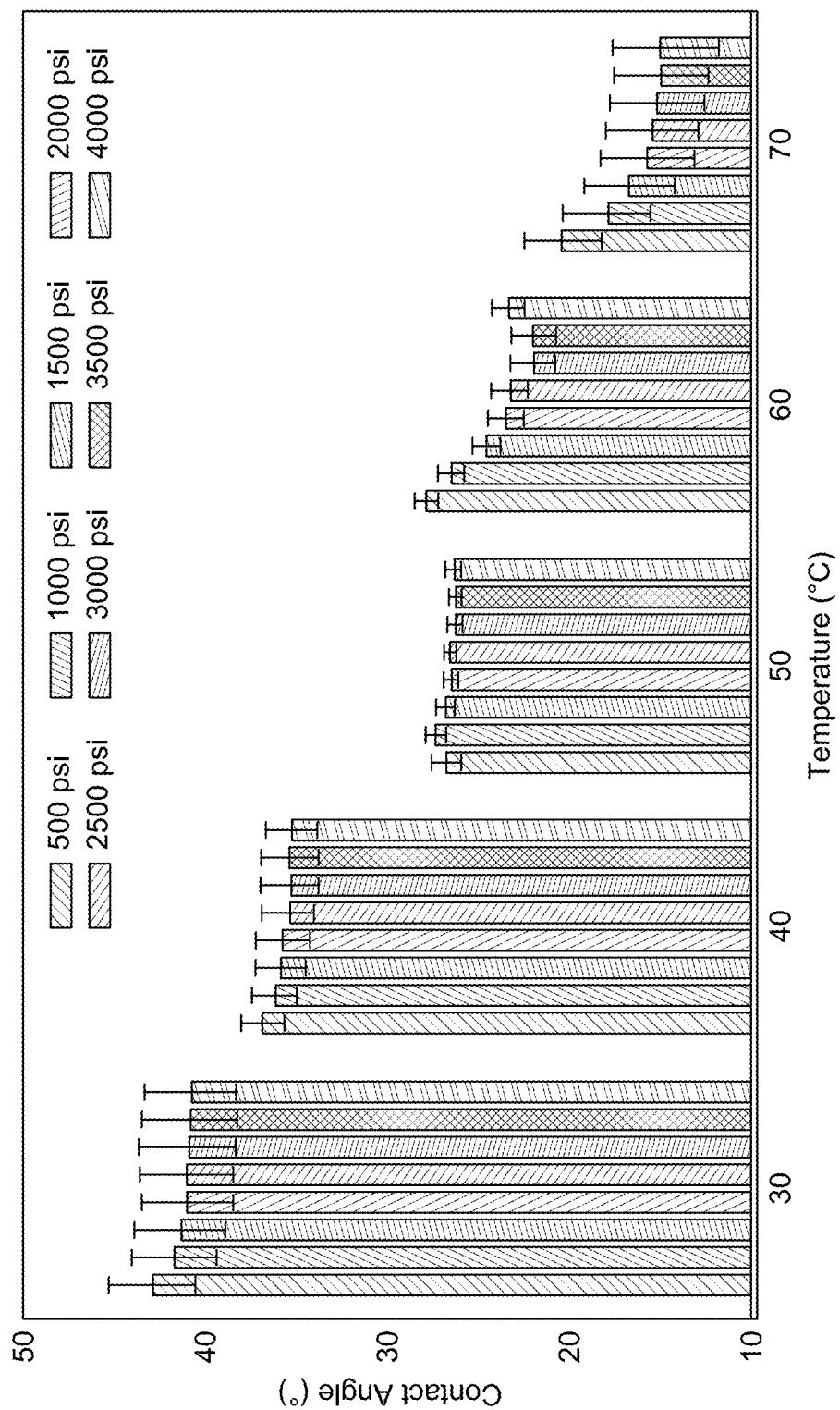
FIG. 6C is a schematic plot depicting an effect of pressure (500 to 4000 psi) on the measured CA for various UHS conditions of temperature (30 to 70° C.) at 10 wt. % NaCl brine salinities for the test case 1, according to certain embodiments.
Figure 6D:
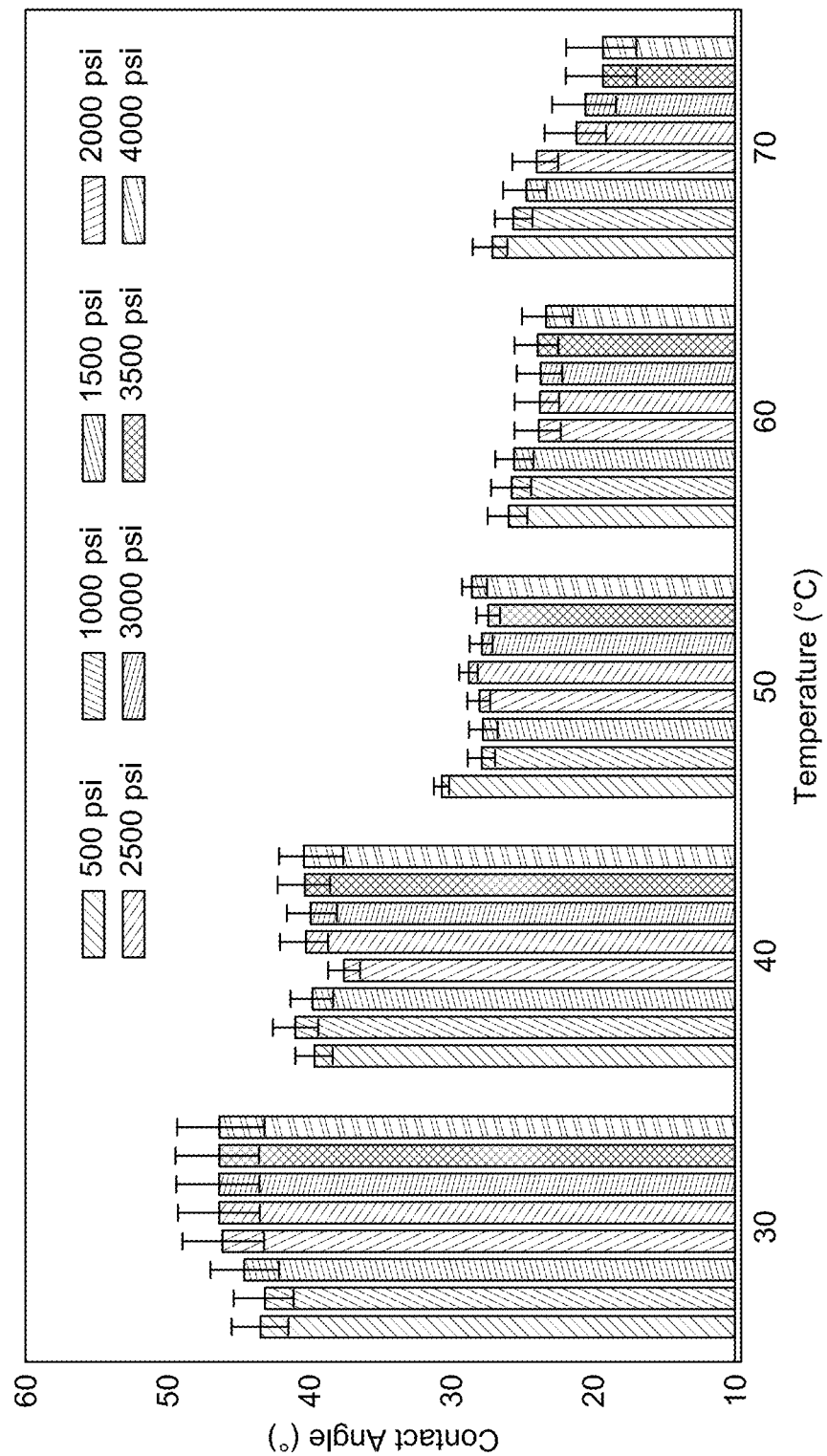
FIG. 6D is a schematic plot depicting an effect of pressure (500 to 4000 psi) on the measured CA for various UHS conditions of temperature (30 to 70° C.) at 15 wt. % NaCl brine salinities for the test case 1, according to certain embodiments.
Figure 6E:
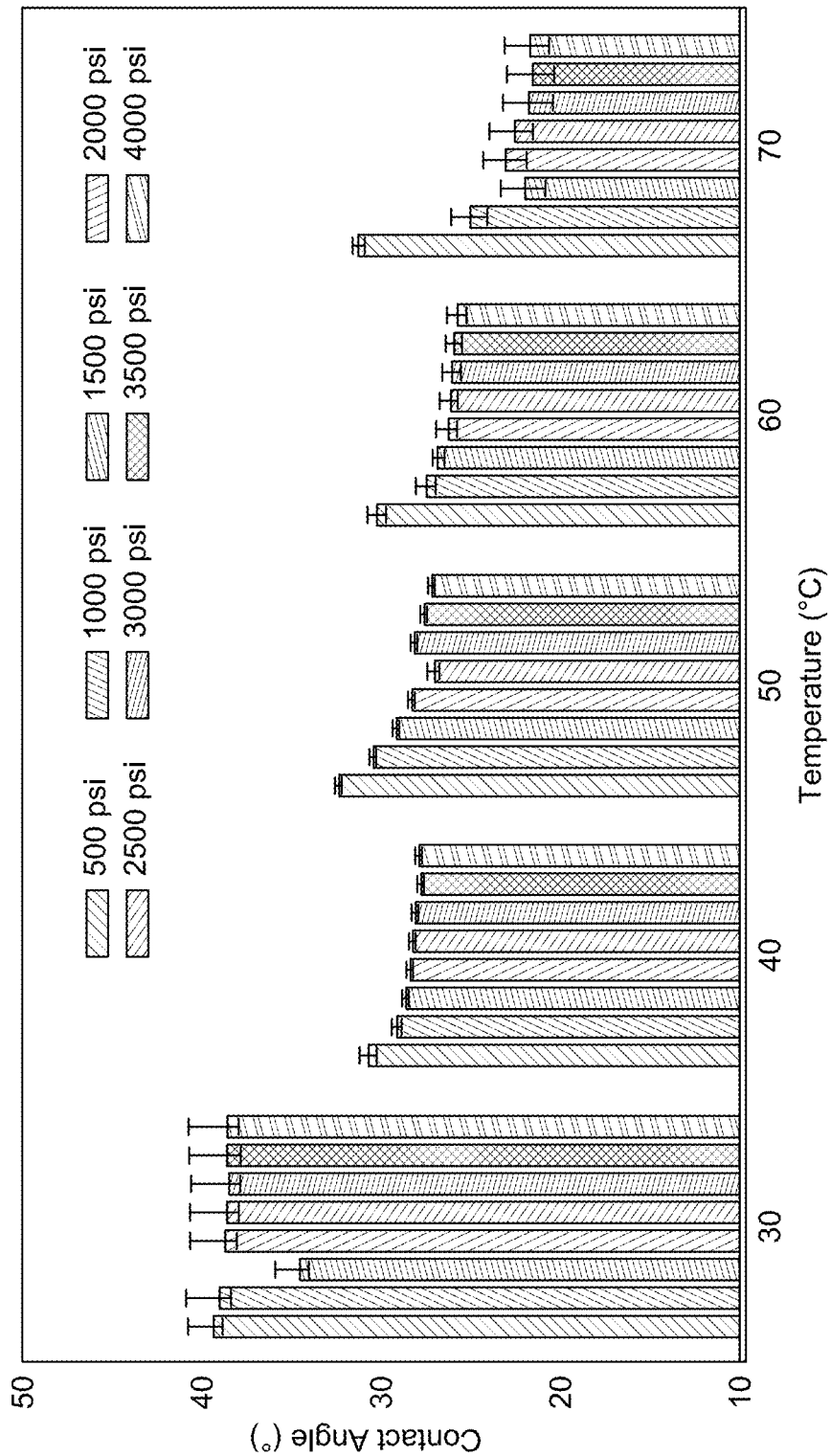
FIG. 6E is a schematic plot depicting an effect of pressure (500 to 4000 psi) on the measured CA for various UHS conditions of temperature (30 to 70° C.) at 20 wt. % NaCl brine salinities for the test case 1, according to certain embodiments.
Figure 7A:
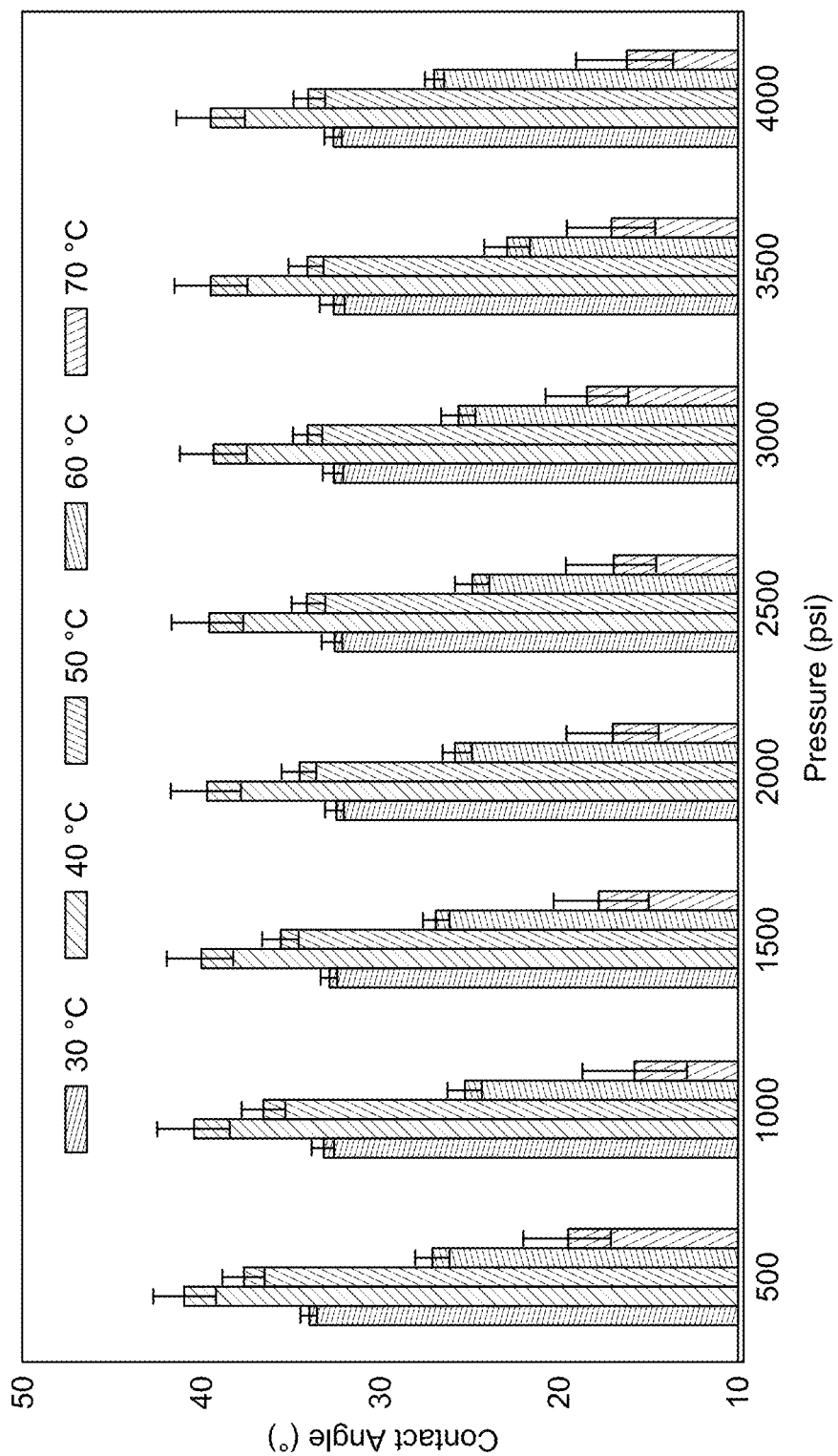
FIG. 7A is a schematic plot depicting an effect of temperature (30 to 70° C.) on the measured CA for various UHS conditions of pressure (500 to 4000 psi) at 2 wt. % NaCl brine salinities for the test case 1, according to certain embodiments.
Figure 7B:
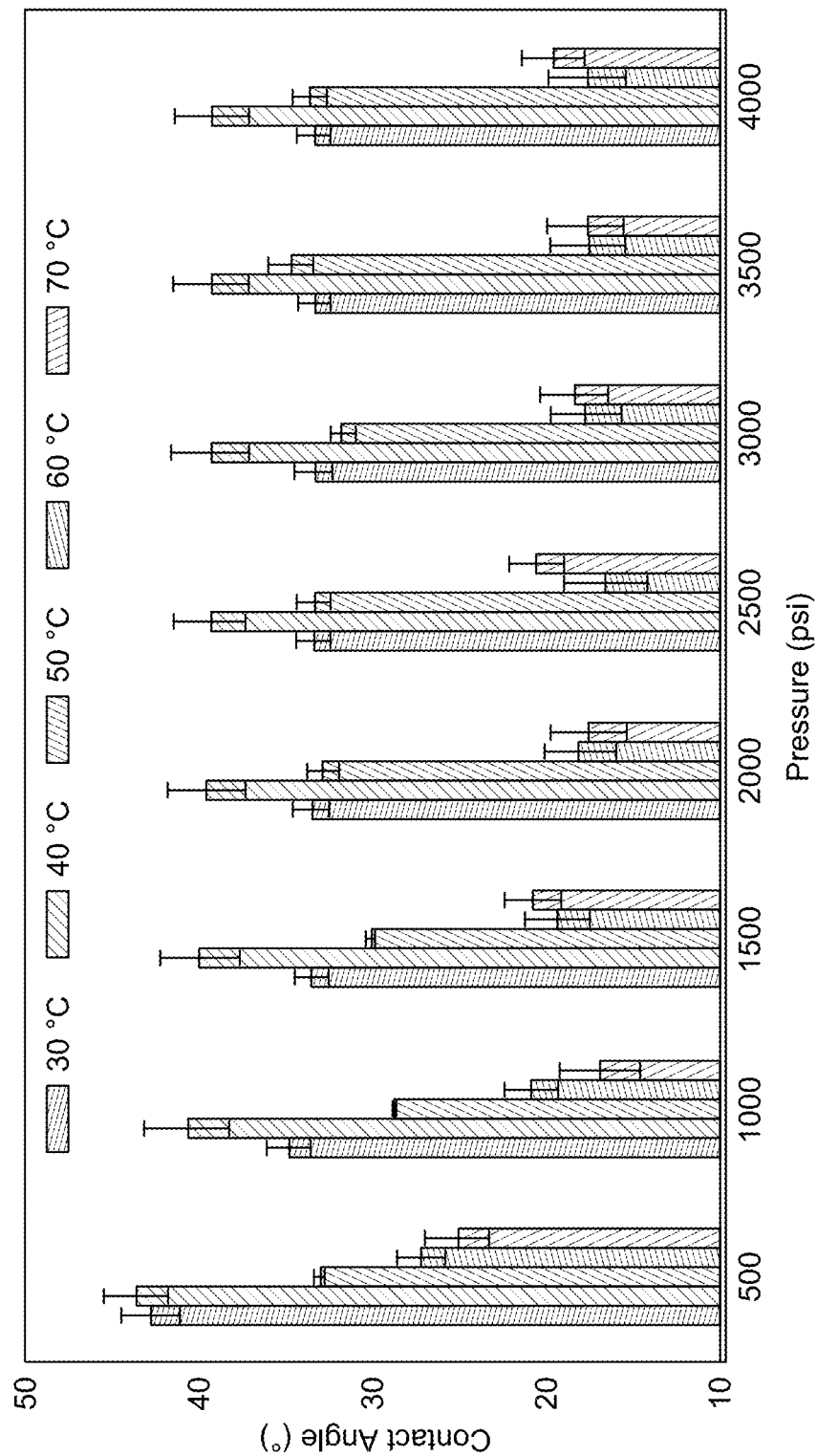
FIG. 7B is a schematic plot depicting an effect of temperature (30 to 70° C.) on the measured CA for various UHS conditions of pressure (500 to 4000 psi) at 5 wt. % NaCl brine salinities for the test case 1, according to certain embodiments.
Figure 7C:
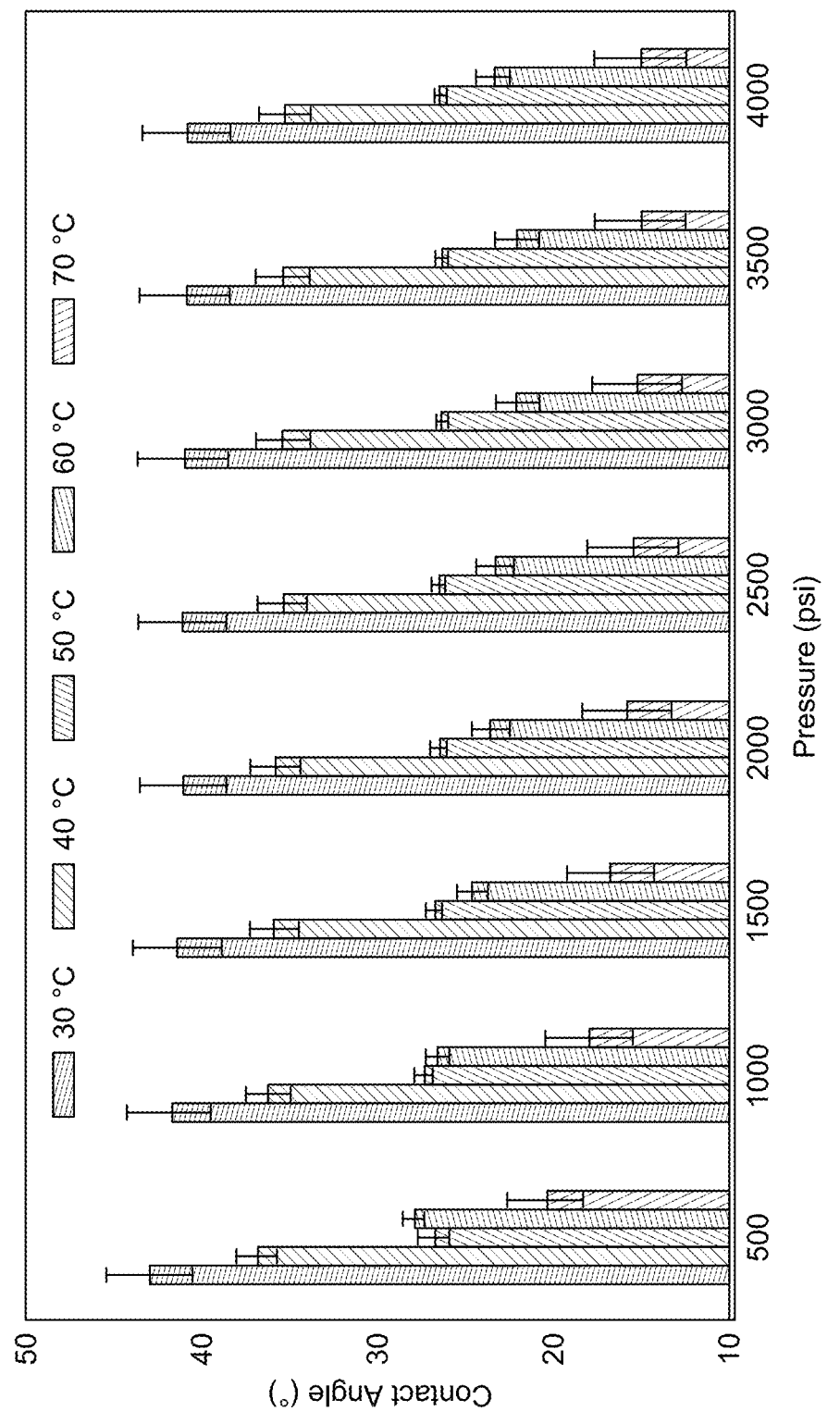
FIG. 7C is a schematic plot depicting an effect of temperature (30 to 70° C.) on the measured CA for various UHS conditions of pressure (500 to 4000 psi) at 10 wt. % NaCl brine salinities for the test case 1, according to certain embodiments.
Figure 7D:
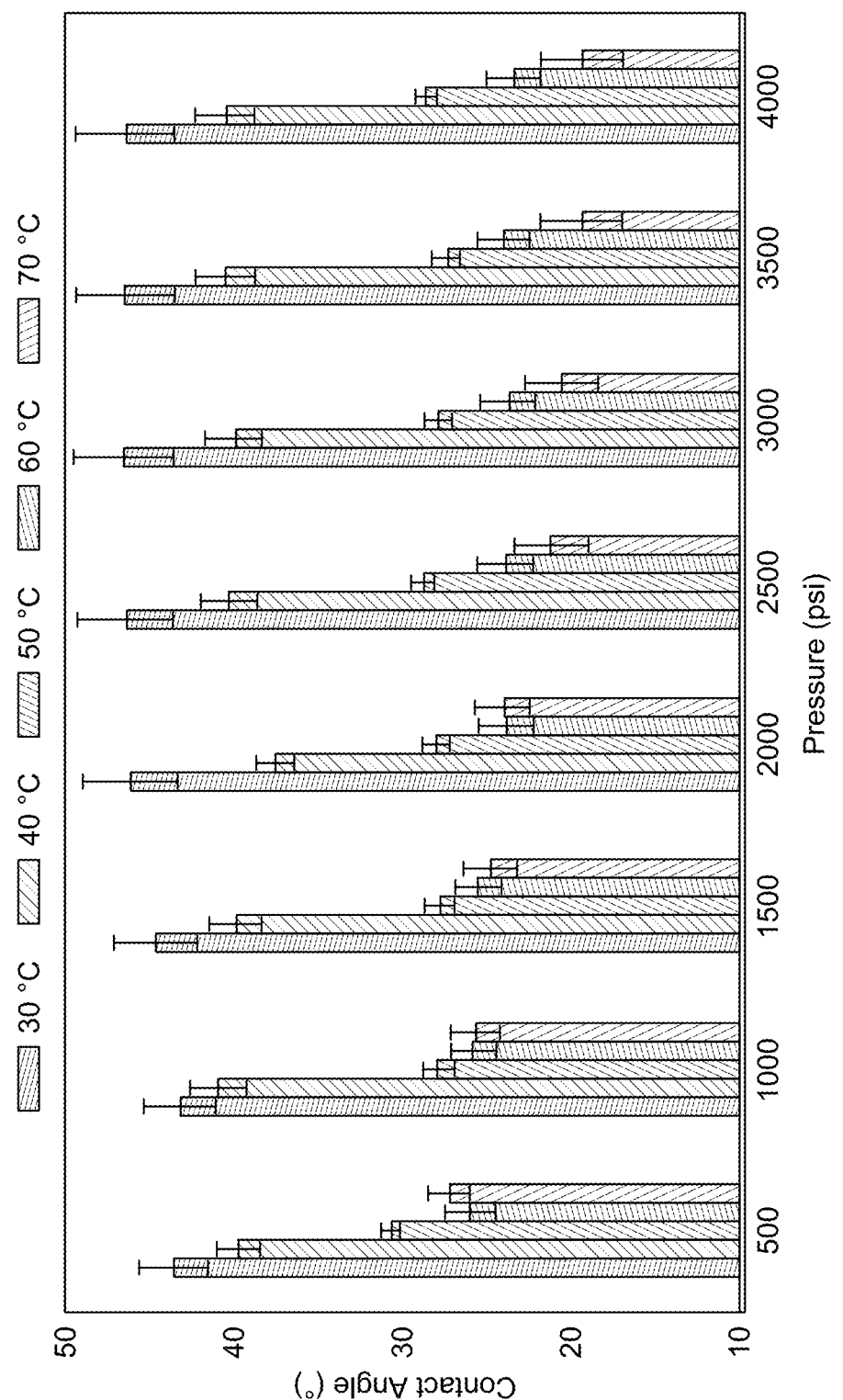
FIG. 7D is a schematic plot depicting an effect of temperature (30 to 70° C.) on the measured CA for various UHS conditions of pressure (500 to 4000 psi) at 15 wt. % NaCl brine salinities for the test case 1, according to certain embodiments.
Figure 7E:
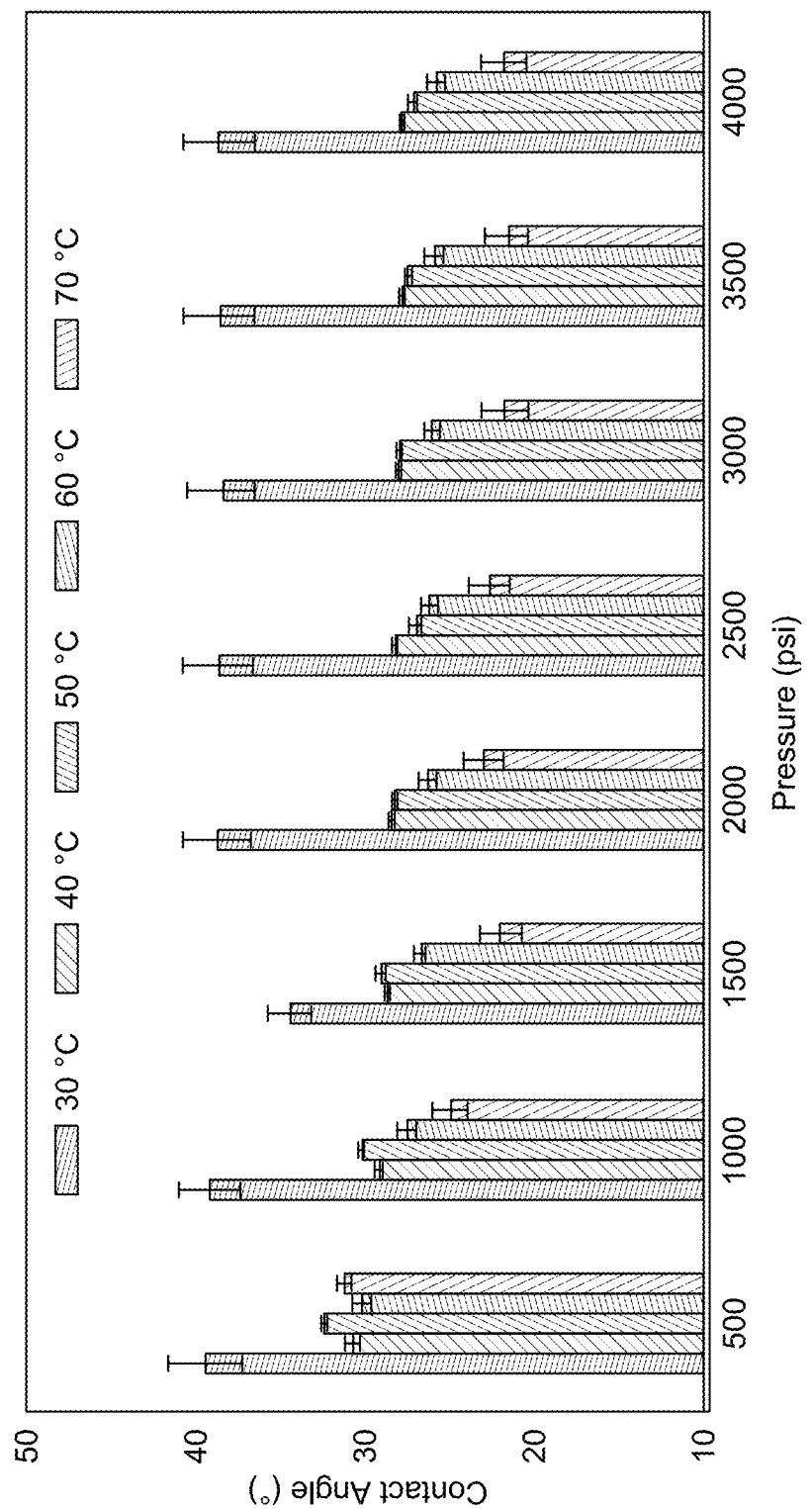
FIG. 7E is a schematic plot depicting an effect of temperature (30 to 70° C.) on the measured CA for various UHS conditions of pressure (500 to 4000 psi) at 20 wt. % NaCl brine salinities for the test case 1, according to certain embodiments.

All the parameters remain the same as earlier mentioned in Eq. (1), however, g=9.81 (m$^2$/s), while an average pore radius (r) was assumed to be 50 nm [See: Nelson P H. *Pore-throat sizes in sandstones, tight sandstones, and shales. Am Assoc Pet Geol Bull* 2009; 93:329-40, which is incorporated herein by reference in its entirety] and 2 μm for the seal and reservoir rocks respectively. In addition, Eq. (4) is applicable when the effect of pore sizes is considered as the major dominating factor over CA and ST, thus, $r_{seal} < r_{reservoir}$. These pores will help to retain the buoyant $H_2$ gas if water-wet (CA<90°) in the smaller pores or $H_2$-wet (CA>90°) in the larger pores. The schematic representation of traps with force balance derived between buoyancy and capillary forces (i.e., seal and seal-reservoir) for column height is shown in FIGS. 5A and 5B.

Example 7: Experimental Calibration

The sessile drop setup used in the present disclosure was calibrated against the data of Hashemi et al [See: Hashemi L, Boon M, Glerum W, Farajzadeh R, Hajibeygi H. *A comparative study for $H_2/CH_4$ mixture wettability in sandstone porous rocks relevant to underground hydrogen storage. Adv Water Resour* 2022; 163:104165, which is incorporated herein by reference in its entirety] for the $H_2$/brine (5 wt. % NaCl)/Bentheimer system, which reports extensive experimental investigation using captive bubbles on an $H_2$/brine/rock (Berea and Bentheimer sandstone) samples. The result of the calibration for the CA setup, according to the present disclosure, was very comparable as shown in Table 2. In the ST case, the method 100 of the present disclosure was calibrated based on the equipment manual, where the surface tension of water at atmospheric pressure and 25° C. was measured for validation. Our measured value (71.91±0.3 dynes/cm) were in close agreement with the mean value 72±0.2 dynes/cm).

TABLE 2

Calibration of the experimental setup for contact angle measurement with literature data

| Parameters | Hashemi et al. (Literature work) | Method of present disclosure |
|---|---|---|
| Rock sample | Bentheimer (~95 quartz) | Pristine (98% quartz) |
| Pressure (psi) | 1460 psi | 1460 psi |
| Temperature (° C.) | 30 | 30 |
| Liquid phase | 5 wt. % NaCl | 5 wt. % NaCl |
| Gas phase | $H_2$ | $H_2$ |
| Contact angle (°) | 34.5 (averaged but ranged between 29.8-42.5) | 36.94 (average) |

Example 8: Correction for Surface Tension Measurement

Due to the limitation of the DSA 100 equipment, the gas phase density was not captured during measurement. As a result, a posterior correction was performed by multiplying the former ST value by the erroneous density difference and dividing the result by the reference brine using Eq. (5).

$$\gamma_{corr} = \frac{(\rho_{brine} - \rho_{mix}) \times \gamma_{program}}{1000} \quad \text{Eq. (5)}$$

Herein, $\rho_{brine}$ and $\rho_{mix}$ in (kg/m³) is the brine and gas mixture densities whereas $\gamma_{corr}$ is the corrected ST in dyne/cm and $\gamma_{program}$ in dyne/cm is the obtained ST based on the ADSA automatic image digitization profile. The gas mixture densities were calculated using Eq. (6) based on the adopted method [See: Hashemi L, Boon M, Glerum W, Farajzadeh R, Hajibeygi H. *A comparative study for $H_2$-$CH_4$ mixture wettability in sandstone porous rocks relevant to underground hydrogen storage. Adv Water Resour* 2022; 163: 104165, which is incorporated herein by reference in its entirety]. The V is the volume in m³ while the subscripts 1, 2, 3, and 4 correspond to $CH_4$, $H_2$, $CO_2$, and $N_2$ gases respectively.

$$\rho_{mix} = \frac{(\rho_1 V_1 + \rho_2 V_2 + \rho_3 V_3 + \rho_4 V_4)}{(V_1 + V_2 + V_3 + V_4)} \quad \text{Eq. (6)}$$

Example 9: Contact Angle Observation

The result presented herein represents the measurement at temperatures (30 to 70° C.) for various pressure (500 psi, 1000 psi, 1500 psi, 2000 psi, 2500 psi, 3000 psi, 3500 psi, and 4000 psi) at reservoir salinities (2 wt. % to 20 wt. %). This was systematically conducted under close supervision to provide comprehensive information on the interfacial interaction between the gas mixtures/brine/rock system.

Example 10: Influence of Pressure, Temperature, and Salinity on Contact Angle Pressure has a profound influence on the $H_2$ wettability of storage and caprock due to its intermolecular interactions between the rock substrate's surface and gas molecules. However, as can be seen in the overall measurement for this gas mixture (Test case 1-80% $H_2$-10% $CH_4$-5% $CO_2$-5% $N_2$) under the investigated reservoir salinities, the effect of pressure, at each experiment was less pronounced. For instance, at 2 wt. % NaCl brine salinity and 30° C. (FIG. 6A), the CA slightly decreased from 33.96° at 500 psi to 32.63° at 4000 psi. Similar trends were noted at 40° C. and 50° C. However, at 60° C. and 70° C., an inconsistency was observed, which is duly attributed to the experimental technique adopted (since the drop was made first before saturating the HPHT chamber with the gas mixture; thus, a slight instability may be imminent). As an example, in this case, when the temperature rose from 50 to 70° C. at 2 wt. % (FIG. 6A) and 5 wt. % (FIG. 6B) respectively, the measured CA both increased and decreased at different pressures. However, as the reservoir salinity increases thereafter (i.e., FIGS. 6C to 6E), the inconsistency was absent suggesting that, the pristine quartz fully became saturated. This general observation was noted in all the measured gas mixtures. As such; while the effect of pressure affects rock wettability, it is however less sensitive as all the presented data points fall within the same region (i.e., Test case 1 [15.15°-46.48°]; Test case 2 [14.94°-48.51°]; Test case 3 [18.80°-60.90°]; Test case 4 [17.07°-45.02°]; Test case 5 [25.08°-48.87°]; Test case 6 [23.64°-49.22°]; and Test case 7 [28.19°-49.74°] implying a water wet condition).

In the case of temperature, a huge variation was observed as seen in FIGS. 7A-7E. For instance, all reported CA at a specific pressure set for all salinities decreased with increasing temperatures. Specifically, at 500 psi for 2 wt. % (FIG. 7A) and 5 wt. % (FIG. 7B) salinities, the CA decreased systematically (besides 30° C.). As for FIGS. 7C to 7E, all CA decreased with increasing temperature at all the investigated pressures.

The study has observed different changes in CA with both pressure and temperature. The increase in CA with the pressure was attributed to the increase in molecular gas density, thus, the intermolecular interactions between $H_2$ and rocks would increase. Consequently, the observed increase in CA with increasing temperature is based on the likelihood of the water molecules and silanol groups on the rock mineral (such as quartz) breaking their $H_2$ bonds at high temperatures. As a result, the affinity between water and the rock reduces as the quantity of surface $H_2$ bonds between them rises. This reduces the hydrophilicity of the substrates and thus increases $H_2$ wettability (higher CA values). Lastly, the decrease in CA with increasing temperature is attributed to the reduction in $H_2$ gas density with temperature. Because, at high temperatures, gases exhibit lower densities (since they have low molecular cohesive energy; thus—their molecules become heated). Hence, they gain more kinetic energy and move faster, leading to a higher collision. Alternatively, this indicates that a temperature increase leads to higher collision and accelerated diffusion of the gas molecules as their kinetic energy also increases (fast motion). Thus, the molecular interactions between the rock surface and gas decrease, and this result in an increase in wettability (lower CA values).

The analysis, according to the present disclosure, indicates that CA decreases with both increasing pressure and temperature (though the effect is more prominent for temperature). In comparison to the literature studies where CA increased with pressure, particularly where pristine quartz was used [See: Ali M, Jha N K, Al-Yaseri A, Zhang Y, Iglauer S, Sarmadivaleh M. *Hydrogen wettability of quartz substrates exposed to organic acids; Implications for hydrogen geo-storage in sandstone reservoirs. J Pet Sci Eng* 2021; 207:109081; Iglauer S, Ali M, Keshavarz A. *Hydrogen Wettability of Sandstone Reservoirs: Implications for Hydrogen Geo-Storage. Geophys Res Lett* 2021; 48:1-5, each of which is incorporated herein by reference in their entirety], two major observations were made. Firstly, the rock substrate was aged in organic acids (to replicate the aquifer condition) and the HPHT chamber was initially saturated with $H_2$ gas before releasing the sessile drop. Hence, the intermolecular action is more likely to be higher between the gas/rock than the brine/rock when the pressure increases (even with density). Moreover, the tilted plates techniques adopted were used to measure dynamic CA (advancing and receding) values at geo-storage conditions compared to the present disclosure where static contact angle measurement was made after allowing for dynamic equilibrium changes. Similar observations with temperature (CA decreases with increasing temperature) have also been reported in other studies for $H_2$/brine/mica [See: Ali M, Yekeen N, Pal N, Keshavarz A, Iglauer S, Hoteit H. *Influence of pressure, temperature and organic surface concentration on hydrogen wettability of caprock; implications for hydrogen geo-storage. Energy Reports* 2021; 7:5988-96, which is incorporated herein by reference in its entirety], $H_2$/brine/carbonates [See: Hosseini M, Fahimpour J, Ali M, Keshavarz A, Iglauer S. *Hydrogen wettability of carbonate formations: Implications for hydrogen geo-storage. J Colloid Interface Sci* 2022; 614:256-66; Hou J, Lin S, Zhang M, Li W. *Salinity, temperature and pressure effect on hydrogen wettability of carbonate rocks. Int J Hydrogen Energy* 2022, each of which is incorporated herein by reference in their entirety], and $H_2$/brine shales [See: Al-mukainah H, Al-yaseri A, Yekeen N, Al J. *Wettability of shale-brine-H 2 system and H 2-brine interfacial tension for assessment of the sealing capacities of shale formations during underground hydrogen storage. Energy Reports* 2022; 8:8830-43; Hosseini M, Fahimpour J, Ali M, Keshavarz A, Iglauer S. *Capillary Sealing Efficiency Analysis of Caprocks: Implication for Hydrogen Geological Storage. Energy & Fuels* 2022, each of which is incorporated herein by reference in their entirety] systems.

The general conclusion between pressure, temperature, and salinity for the gas mixtures herein; is that CA has no discernable effect on pressure and salinity, whereas CA decreases with increasing temperature. The work by Hashemi et al., confirms the investigation in terms of pressure and salinity for both $H_2$/brine/rock and $CH_4$—$H_2$/brine/rock systems, as they noted no correlation between measured CA with pressure, temperature, and salinity. Higgs et al. also reported no conclusive correlation between salinity and CA under the studied experimental conditions [See: Higgs S, Da Wang Y, Sun C, Ennis-King J, Jackson S J, Armstrong R T, et al. *In-situ hydrogen wettability characterization for underground hydrogen storage. Int J Hydrogen Energy* 2022; 47:13062-75, which is incorporated herein by reference in its entirety].

Example 11: Surface Tension

Influence of Pressure, Temperature, and Salinity on Surface Tension

Figure 8A:
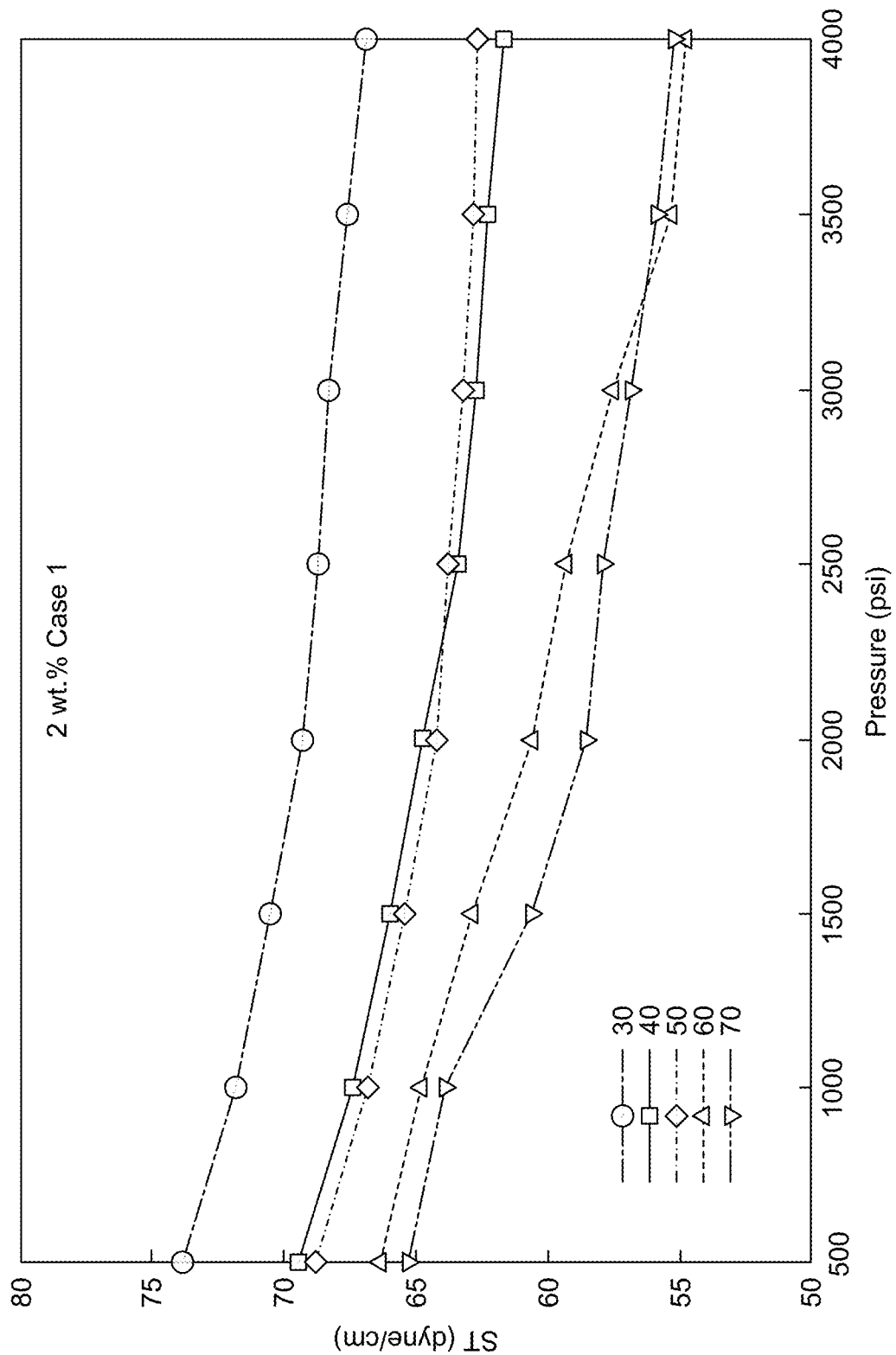
FIG. 8A is a schematic plot depicting an effect of pressure and temperature on the measured ST at 2 wt. % NaCl brine salinities for the test case 1, according to certain embodiments.
Figure 8B:
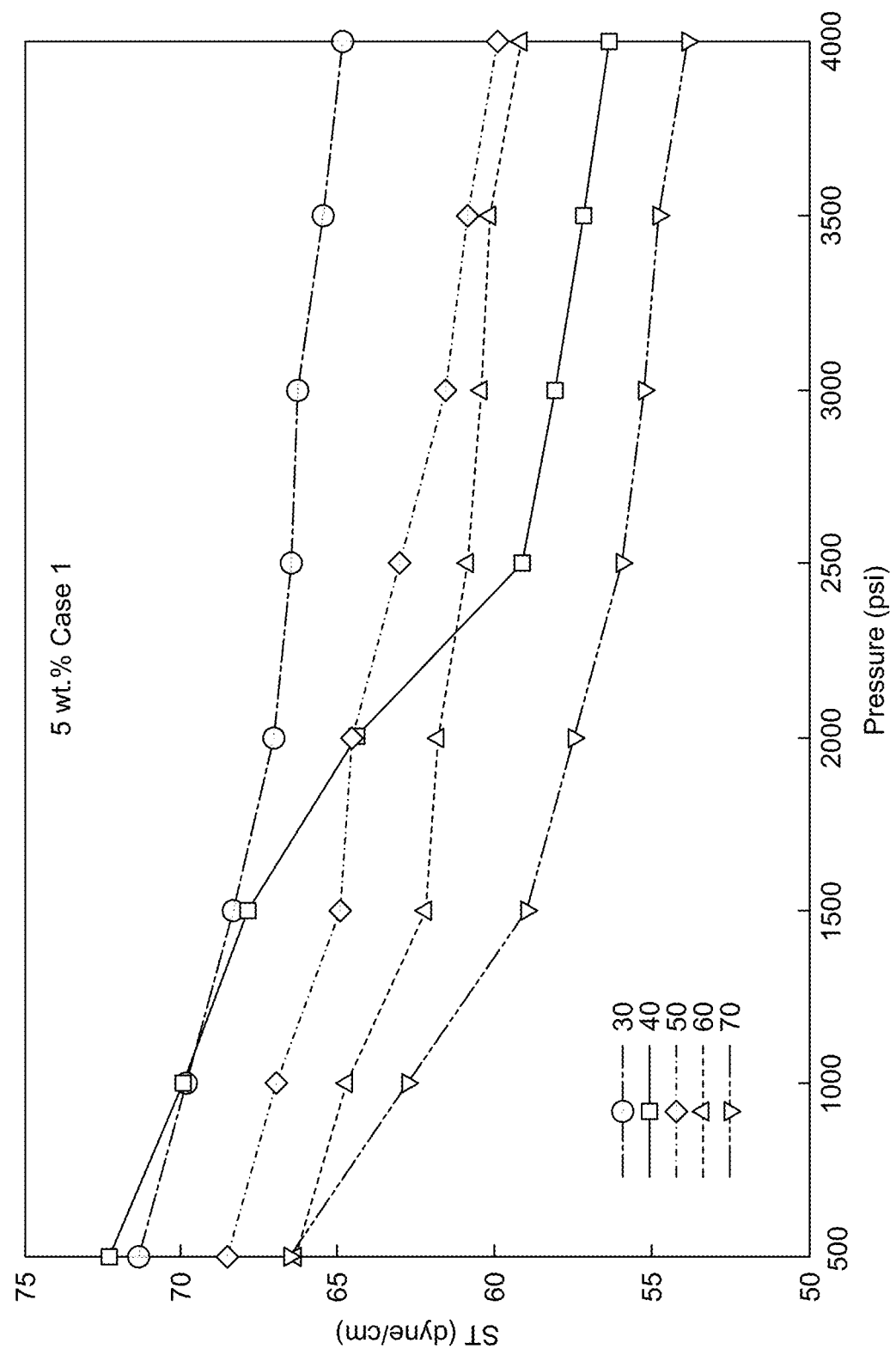
FIG. 8B is a schematic plot depicting an effect of pressure and temperature on the measured ST at 5 wt. % NaCl brine salinities for the test case 1, according to certain embodiments.
Figure 8C:
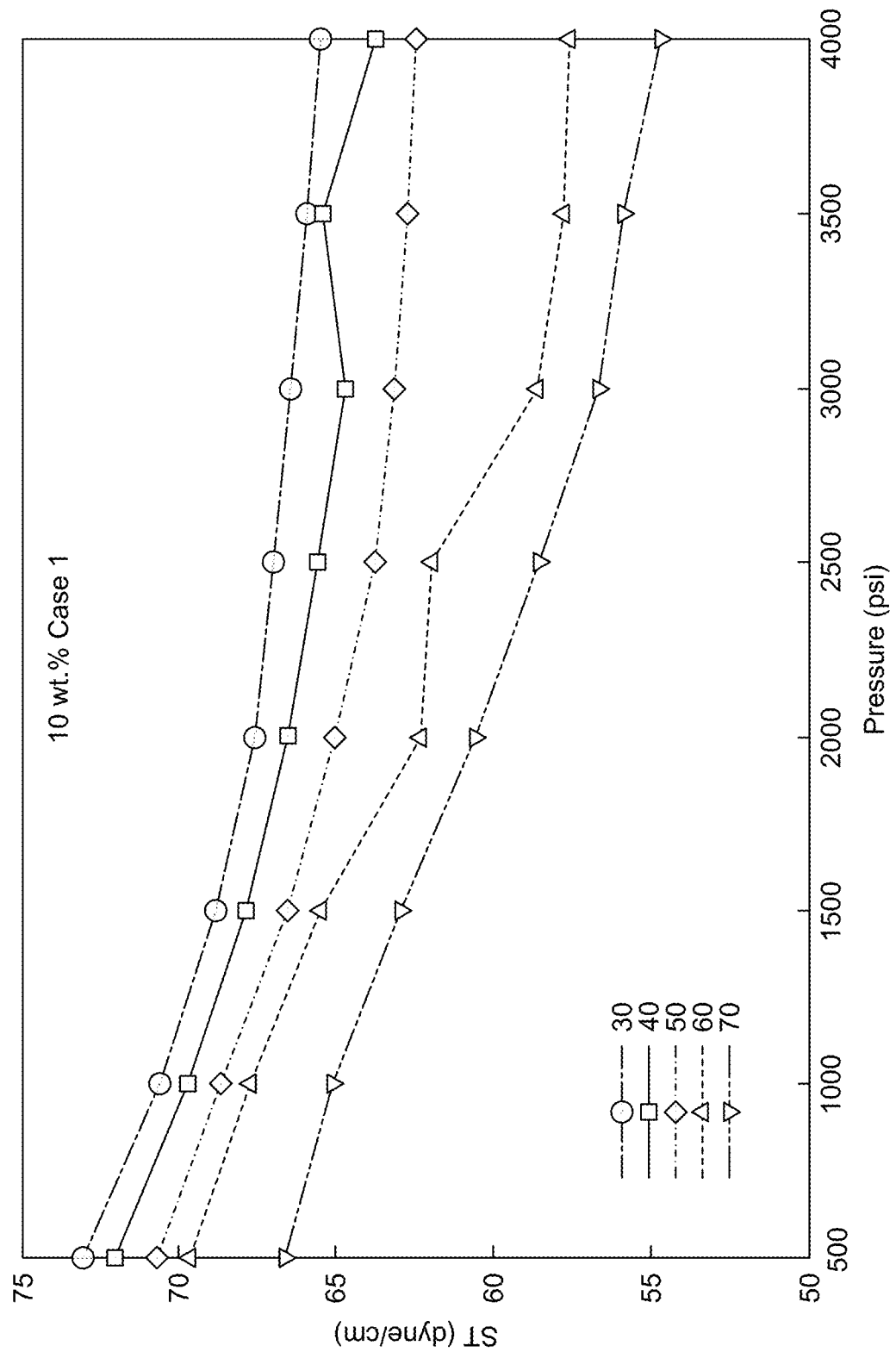
FIG. 8C is a schematic plot depicting an effect of pressure and temperature on the measured ST at 10 wt. % NaCl brine salinities for the test case 1, according to certain embodiments.
Figure 8D:
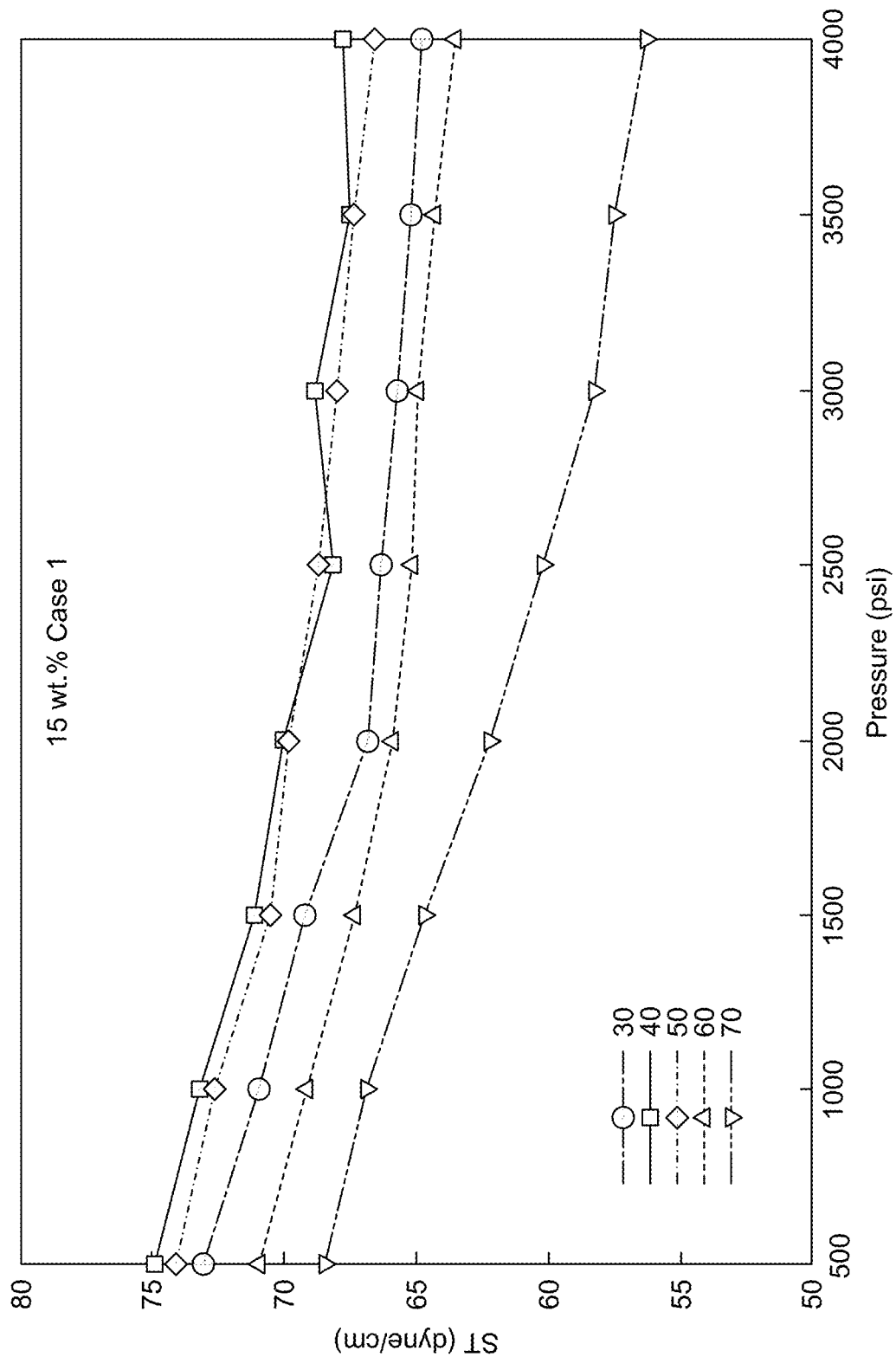
FIG. 8D is a schematic plot depicting an effect of pressure and temperature on the measured ST at 15 wt. % NaCl brine salinities for the test case 1, according to certain embodiments.
Figure 8E:
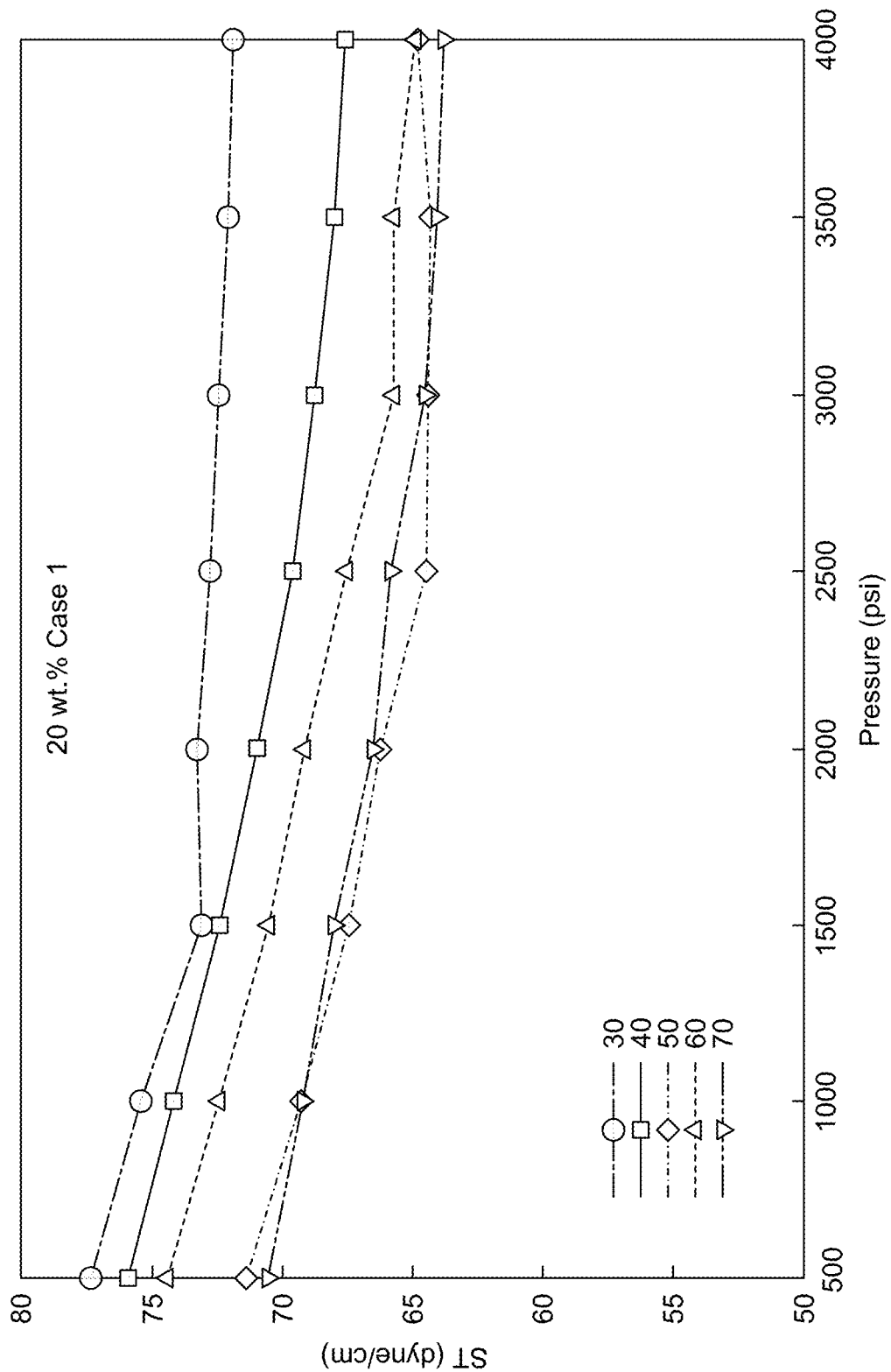
FIG. 8E is a schematic plot depicting an effect of pressure and temperature on the measured ST at 20 wt. % NaCl brine salinities for the test case 1, according to certain embodiments.
Figure 9A:
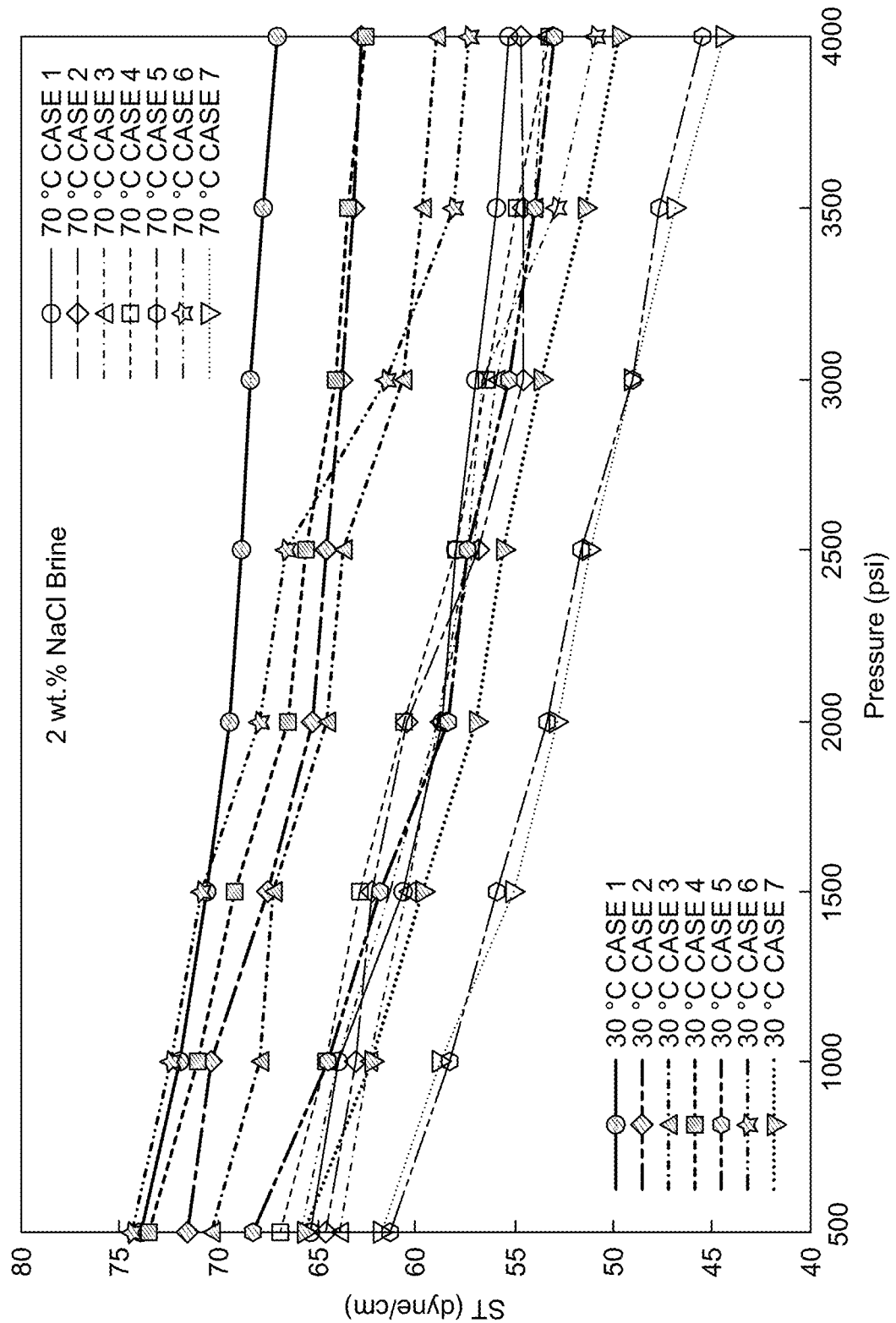
FIG. 9A is a schematic plot depicting an effect of temperature (30 and 70° C.) on the measured ST for various UHS conditions of pressure (500 to 4000 psi) at 2 wt. % NaCl brine salinities for test cases 1-7; the test case 1 representing (80% $H_2$-10% $CH_4$-5% $CO_2$-5% $N_2$), test case 2 (70% $H_2$-20% $CH_4$-5% $CO_2$-5% $N_2$), test case 3 (60% $H_2$-30% $CH_4$-5% $CO_2$-5% $N_2$), test case 4 (50% $H_2$-40% $CH_4$-5% $CO_2$-5% $N_2$), test case 5 (40% $H_2$-50% $CH_4$-5% $CO_2$-5% $N_2$), test case 6 (30% $H_2$-60% $CH_4$-5% $CO_2$-5% $N_2$), and test case 7 (20% $H_2$-70% $CH_4$-5% $CO_2$-5% $N_2$), according to certain embodiments.
Figure 9B:
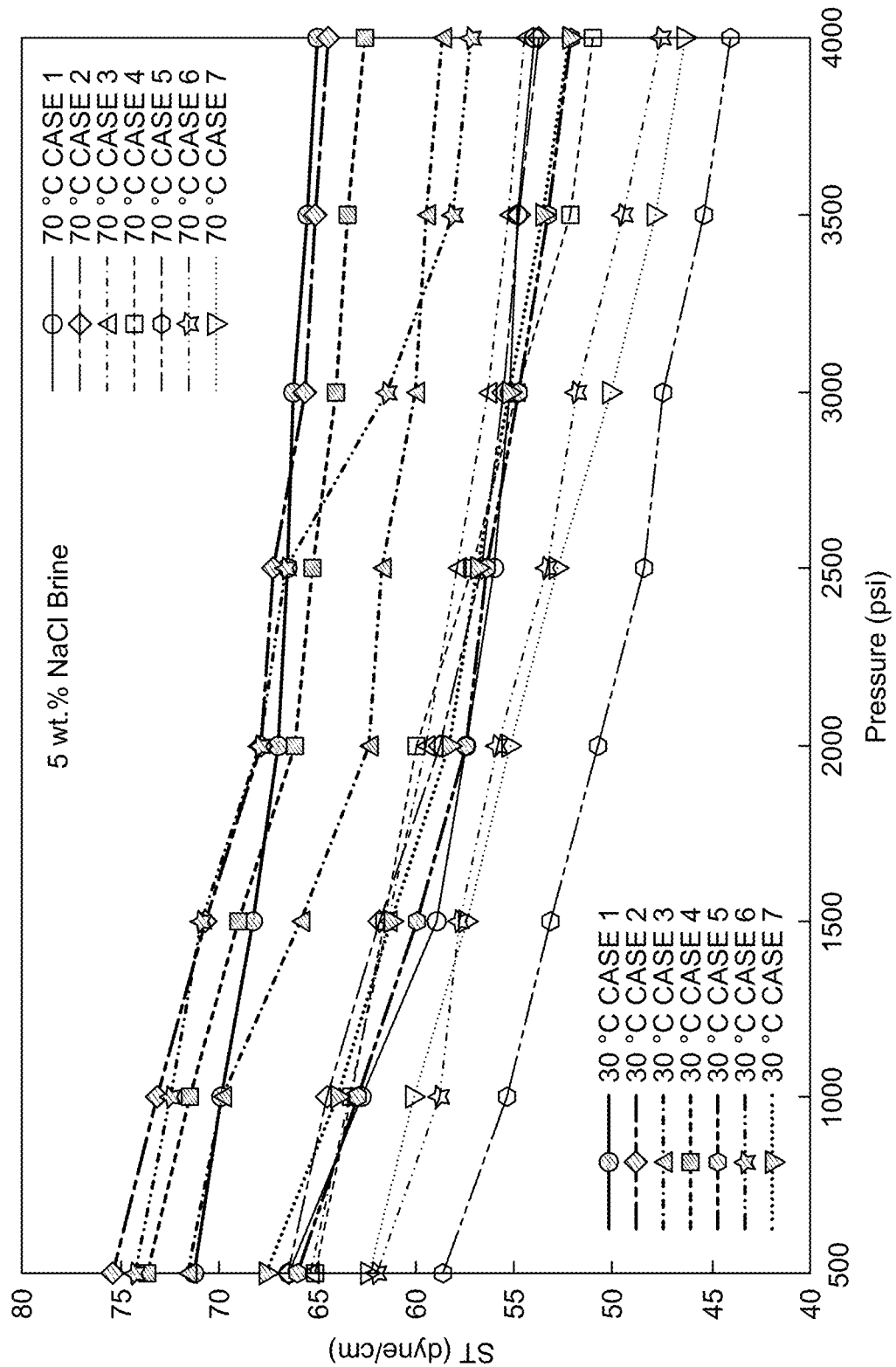
FIG. 9B is a schematic plot depicting an effect of temperature (30 and 70° C.) on the measured ST for various UHS conditions of pressure (500 to 4000 psi) at 5 wt. % NaCl brine salinities for the test cases 1, 2, 3, 4, 5, 6, and 7, according to certain embodiments.
Figure 9C:
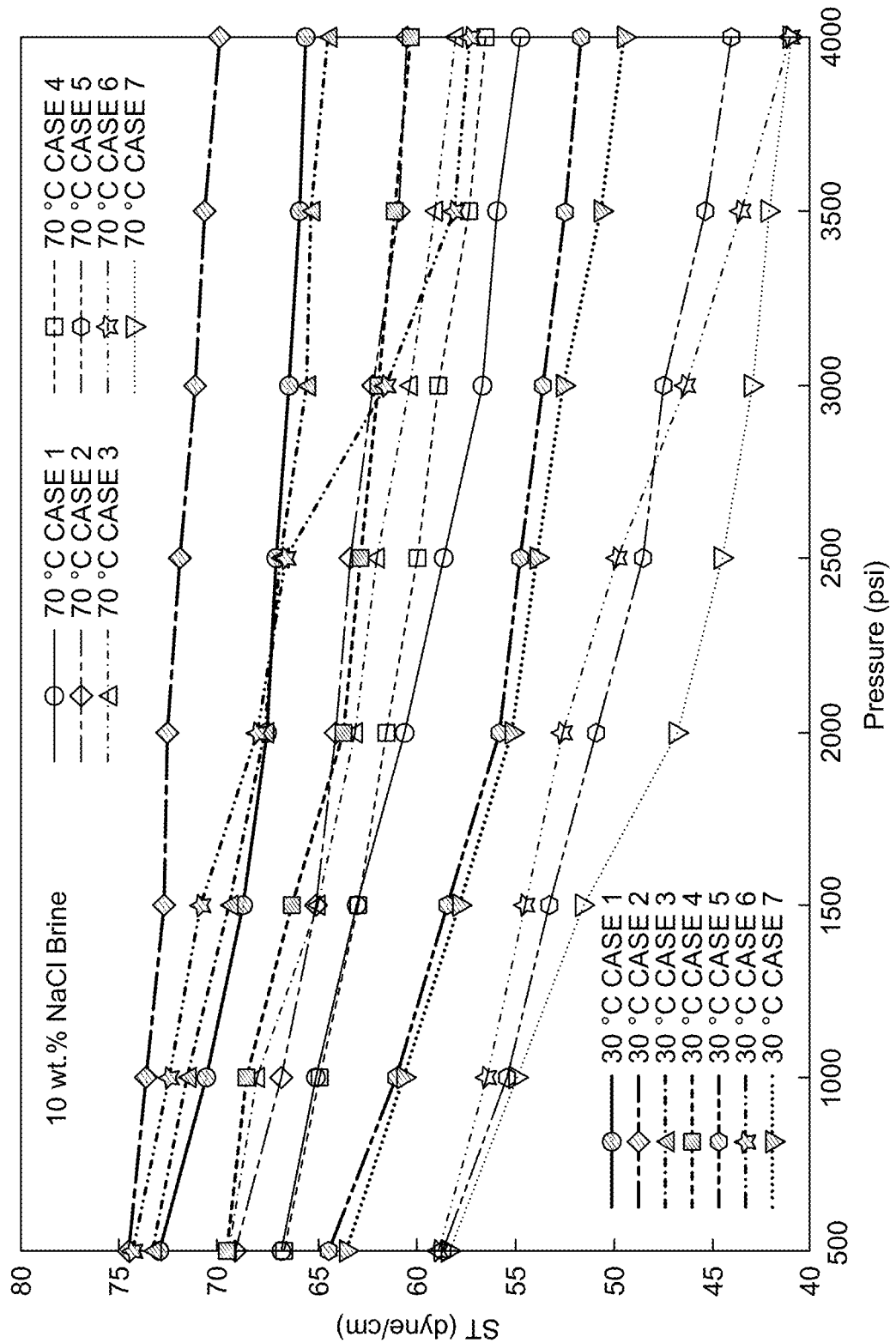
FIG. 9C is a schematic plot depicting an effect of temperature (30 and 70° C.) on the measured ST for various UHS conditions of pressure (500 to 4000 psi) at 10 wt. % NaCl brine salinities for the test cases 1, 2, 3, 4, 5, 6, and 7, according to certain embodiments.
Figure 9D:
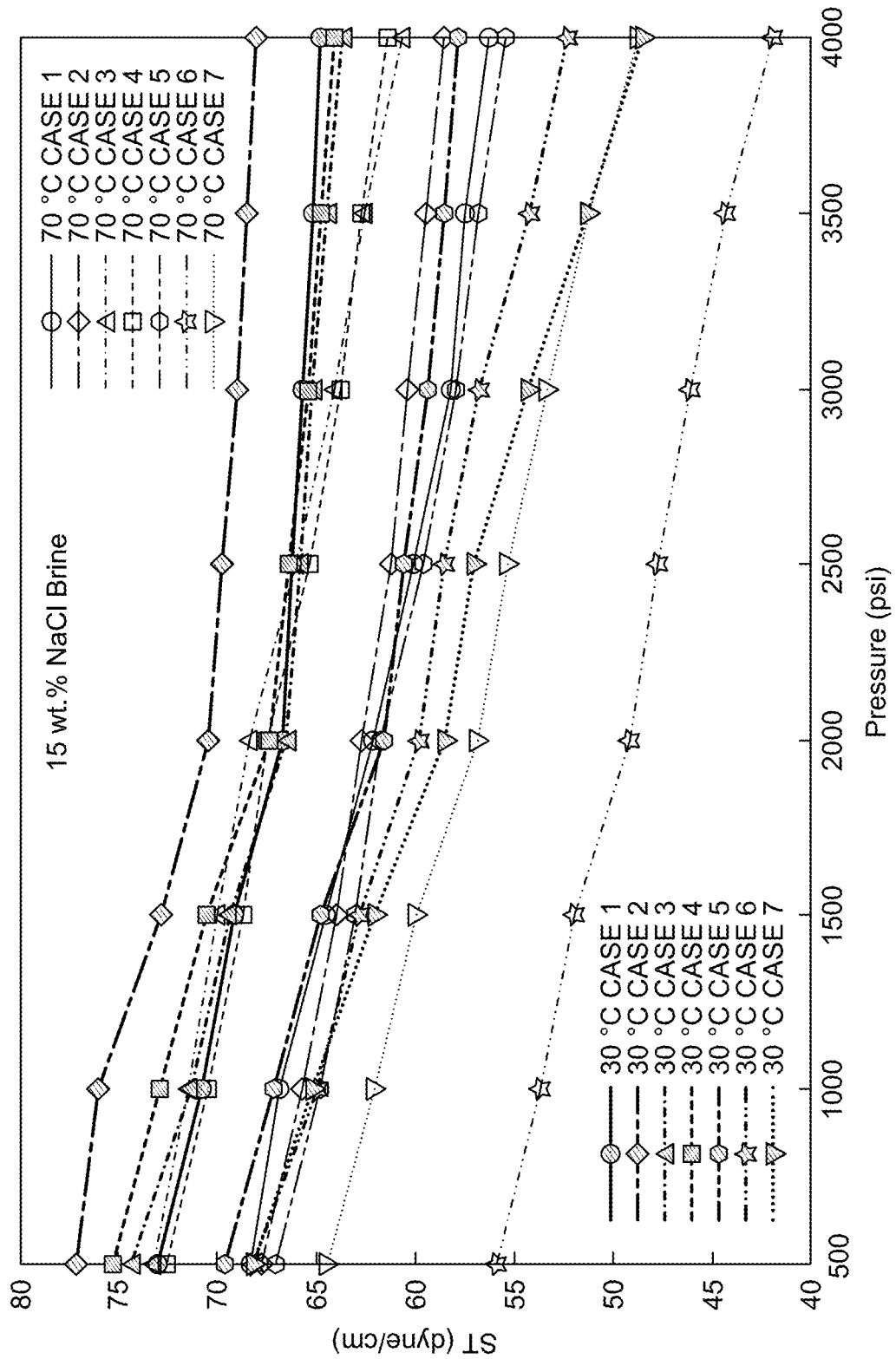
FIG. 9D is a schematic plot depicting an effect of temperature (30 and 70° C.) on the measured ST for various UHS conditions of pressure (500 to 4000 psi) at 15 wt. % NaCl brine salinities for all test cases 1, 2, 3, 4, 5, 6, and 7, according to certain embodiments.
Figure 9E:
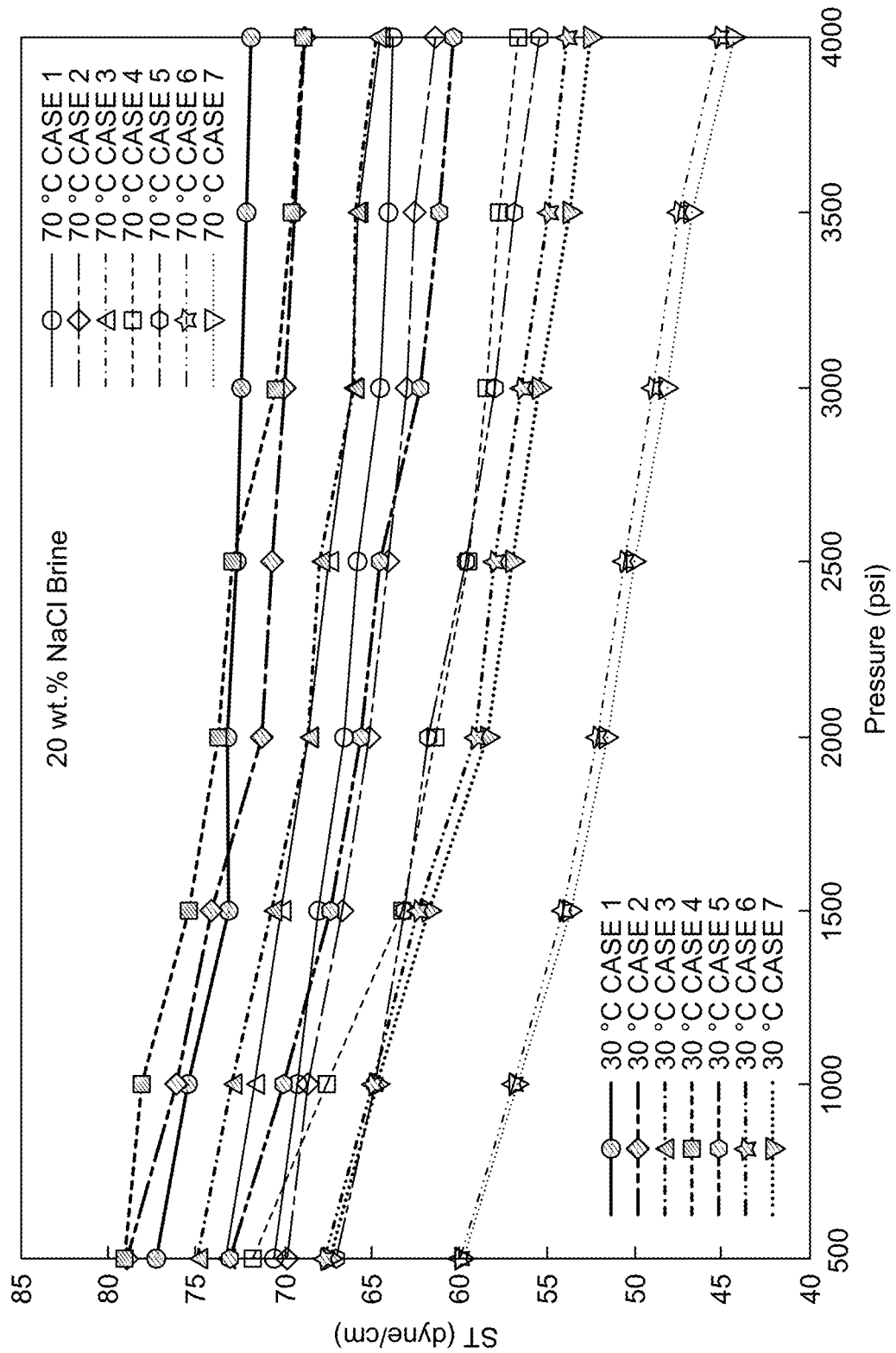
FIG. 9E is a schematic plot depicting an effect of temperature (30 and 70° C.) on the measured ST for various UHS conditions of pressure (500 to 4000 psi) at 20 wt. % NaCl brine salinities for the test cases 1, 2, 3, 4, 5, 6, and 7, according to certain embodiments.

As shown in FIGS. 8A-8E (i.e., Test case 1-80% $H_2$-10% $CH_4$-5% $CO_2$-5% $N_2$), ST decreases with both pressure and temperature at any given salinity. For instance, at 10 wt. % NaCl brine and 50° C., ST decreased from 70.64 dynes/cm at 500 psi to 62.40 dynes/cm at 4000 psi (FIG. 8C). This trend is observed in previous study on single gas/brine and $CH_4$—$H_2$ gas mixture/brine systems. The decrease in ST as a function of temperature is due to an increase in molecular thermal activity, which produces a drop in the intermolecular cohesive forces for each phase and an increase in the adhesive actions between the gas mixture and brine molecules at the interface [See: Mirchi V, Dejam M, Alvarado V. *Interfacial tension and contact angle measurements for hydrogen-methane mixtures/brine/oil-wet rocks at reservoir conditions. Int J Hydrogen Energy* 2022, which is incorporated herein by reference in its entirety]. The effect of salinity was hardly distinguishable in all the gas mixture fractions (i.e., Test cases 1 to 7) since all ST decreases monotonically with salinity.

A further comparison was made as seen in FIGS. 9A-9E. For instance, in the 2 wt. % (FIG. 9A); where 80% $H_2$-10% $CH_4$ was combined with 5% $CO_2$ and 5% $N_2$, the ST (at 30° C.) decreased from 73.88 dynes/cm (at 500 psi) to 66.96 dynes/cm (at 4000 psi) whereas the ST (at 70° C.) decreased from 65.36 dynes/cm (at 500 psi) to 55.23 dynes/cm (at 4000 psi) suggesting a minute difference (6.92 dynes/cm at 30° C. and 10.13 dynes/cm at 70° C.). In comparison with Test case 4 (where 50% $H_2$-40% $CH_4$ was combined with 5% $CO_2$ and 5% $N_2$) at 2 wt. % (FIG. 9A), the ST was found to decrease by 10.99 dynes/cm (i.e. from 73.52 dynes/cm at 500 psi to 62.53 dynes/cm at 4000 psi) at 30° C. whereas at 70° C., ST decrease by 13.73 dynes/cm (i.e. from 66.92 dynes/cm at 500 psi to 53.19 dynes/cm at 4000 psi). This comparable difference observed between Test cases 1 and 4 when the composition of $H_2$ and $CH_4$ were varied falls within most reported literature for $H_2$/brine systems at even lower brine salinity such as those reported by Higgs et al. (0.1 wt. %, 0.2 wt. %, and 0.5 wt. %); Al-Mukainah et al. (10 wt. %); and Esfandyari et al. [See: Esfandyari H, Sarmadivaleh M, Esmaeilzadeh F, Ali M, Iglauer S, Keshavarz A. *Experimental evaluation of rock mineralogy on hydrogen-wettability: Implications for hydrogen geo-storage. J Energy Storage* 2022; 52:104866, which is incorporated herein by reference in its entirety](KCl—0.15 wt. %; $MgCl_2$—0.5 wt. %; $CaCl_2$—0.3 wt. % and NaCl—11 wt. %).

The general conclusion herein is that, while it has been demonstrated by laboratory experiments, that ST decreases very slightly with increasing pressure, but strongly with increasing temperature [See: Chow Y T F, Maitland G C, Trusler J P M. *Interfacial tensions of* ($H_2O+H_2$) *and* ($H_2O+CO_2+H_2$) *systems at temperatures of* (298-448) *K and pressures up to 45 MPa. Fluid Phase Equilib* 2018; 475:37-44, which is incorporated herein by reference in its entirety], ST will always remain relatively high [See: Hosseini M, Fahimpour J, Ali M, Keshavarz A, Iglauer S. *$H_2$-brine interfacial tension as a function of salinity, temperature, and pressure; implications for hydrogen geo-storage. J Pet Sci Eng* 2022; 213, which is incorporated herein by reference in its entirety], and $H_2$ in the presence of other gas mixtures ($CH_4$, $CO_2$, and $N_2$) and brine are thus always immiscible at reservoir conditions (except the small amount of $H_2$ which chemically dissolves in the brine and the small amount of water which evaporates into the gas mixtures) [See: Shi Z, Jessen K, Tsotsis T T. *Impacts of the subsurface storage of natural gas and hydrogen mixtures. Int J Hydrogen Energy* 2020; 45:8757-73, which is incorporated herein by reference in its entirety]. Furthermore, the effect of the varied gas mixtures in the subsurface has minimal impact on salinity as all the measured values fall within 41-80 dynes/cm. In addition, a close look at FIGS. 9A-9E show that, higher ST values were observed when $H_2$ fractions (Test cases 1, 2 and 3) was higher in the mixtures, as Test cases 5, 6 and 7 with higher $CH_4$ fraction recorded lower ST values. Several experimental investigations have also observed a similar range of ST using different binary and ternary gas mixtures. For example, an ST range between 50-70 dynes/cm for different $H_2$—$CH_4$ gas mixtures has been reported (CA for these STs varied between 38.3°-44°). Recently, Mirchi et al. [See: Mirchi V, Dejam M, Alvarado V. *Interfacial tension and contact angle measurements for hydrogen-methane mixtures/brine/oil-wet rocks at reservoir conditions. Int J Hydrogen Energy* 2022, which is incorporated herein by reference in its entirety] also found IFT ranges for different $H_2$—$CH_4$ mixture/brine systems for a depleted oil and gas reservoir ranging from 53.55-70.36 dynes/cm. This result also validates the result of the present disclosure, and the density of the sister gases (i.e., $CO_2$ and $N_2$) which are much heavier than $H_2$ and $CH_4$ (at higher pressure) may have impacted the high ST range reported in this study.

Example 12: Column Height

The $H_2$ column heights for both cases: Eq. (3) and Eq. (4) were determined and the results for all the gas mixtures were depicted in FIGS. 5A and 5B [See: Nasiru Salahu Muhammed, Bashirul Haq, Dhafer Al Shehri. *Role of methane as a cushion gas for hydrogen storage in depleted gas reservoirs. Int J Hydrogen Energy* 2023, which is incorporated herein by reference in its entirety]. The measured gas-mixture/brine/rock CA and gas-mixture/brine ST were used for the respective h calculations. It can be seen that a little variation between column heights was imminent, implying that the capillary reservoir effect impacts the immobilized gas beneath the seal rock. Particularly, $h_{seal\text{-}reservoir}$ was lower than the $h_{seal}$. This, therefore, shows the impact of the reservoir pore radius on the capillary entry pressure. However, a general observation indicates that higher capillary entry pressure (i.e., low CA), will favor high column height for storage as seen in Eq. (3) and Eq. (4), for both $h_{seal}$ and $h_{seal}$-reservoir, respectively.

Example 13: Selection of Gas Mixture

Cushion gas ($CH_4$, $CO_2$, and $N_2$) plays a significant role in subsurface formations as it serves as a buffer during $H_2$ injection/withdrawal cycles as well as to reduce contamination during withdrawal. Their choice and impact on the reservoir hydrodynamics are however influenced by factors such as cost, reservoir parameters, and the physical characteristics of the native gas. For instance, a storage rock surface with a higher affinity towards the cushion gas rather than $H_2$ lowers the possibility of $H_2$ penetration into the pore space and promotes simpler separation during injection and withdrawal cycles.

The range of the CA for the respective gas mixtures (i.e., Test case 1 [15.15°-46.48°]; Test case 2 [14.94°-48.51°]; Test case 3 [18.80°-60.90°]; Test case 4 [17.07°-45.02°]; Test case 5 [25.08°-48.87°]; Test case 6 [23.64°-49.22°]; and Test case 7 [28.19°-49.74°] at the investigated conditions predominantly showed a water-wet condition whereas the ST range for each mixture: Test case 1 [53.98 dynes/cm-77.31 dynes/cm]; Test case 2 [53.80 dynes/cm-79.02 dynes/cm]; Test case 3 [52.71 dynes/cm-76.11 dynes/cm]; Test case 4 [51.11 dynes/cm-79.42 dynes/cm]; Test case 5 [44.01 dynes/cm-73.08 dynes/cm]; Test case 6 [41.04 dynes/cm-74.32 dynes/cm] and Test case 7 [41.00 dynes/cm-68.26 dynes/cm] approximately indicate that the two-phase interface becomes easier to break due to the decreasing ST.

According to the present disclosure, the cushion gas effect shows that only the measured CA for Test case 3 (60% $H_2$-30% $CH_4$-5% $CO_2$-5% $N_2$) at 2 wt. % (at 40° C.) and 5 wt. % (at 30 and 40° C.) fell within the weakly water-wet condition [18.80°-60.90°] whereas others fell within strongly water-wet. This condition is favorable for UHS injection and withdrawal as the best recovery takes place when there are limited faces caused by either weakly water wet (50-70°) to mostly intermediate condition (70-100°). This is because $H_2$ can preferentially flow through the larger pores resulting in a higher relative permeability [See: Lysyy M, Føyen T, Johannesen E B, Fernø M, Ersland G. *Hydrogen Relative Permeability Hysteresis in Underground Storage Geophysical Research Letters* 2022, which is incorporated herein by reference in its entirety] which in turn facilitates the injectivity of the reservoir as the amount of capillary-trapped $H_2$ will be smaller during withdrawal. Moreover, the high CA towards 90 degrees leads to a lower volume of trapped $H_2$ due to a reduction in capillary entry pressure.

Furthermore, as the $H_2$ fraction reduces, the ST was observed to decrease (though not consistent along the investigated conditions) slightly with temperature. This is likely due to the relatively greater interaction of brine and $CH_4$ molecules at the interface when compared to the brine and $H_2$. Moreover, the bond strength of $CH_4$ molecules is lower than $H_2$ molecules (since $CO_2$ and $N_2$ are indifferent as their fractions remain the same in both cases) [See: Kildahl N K. *Bond energy data summarized. J Chem Educ* 1995; 73:423-4, which is incorporated herein by reference in its entirety]. Therefore, it is most likely that when the $H_2$ proportion in the mixture is reduced, interfacial activity increases, resulting in lower IFT and better $CH_4$ molecule accumulation at the interface. This accumulation (at $CH_4$—$H_2$ interphase) can in prospect reduce the hydrodynamic mixing effects during withdrawal.

Test case 3, with a relatively lower $H_2$ (60%) and $CH_4$ fraction (30%) therefore presents an optimum design. This implies that a higher $H_2$ fraction (i.e., Test cases 1 and 2) will lead to higher ST (posing a significant threat to withdrawal) and less $CH_4$—$H_2$ interphase whereas lower $H_2$ fraction (i.e., Test cases 4, 5, 6, and 7) will have a relatively lower IFT (recommended for gas immobilization) and higher $CH_4$—$H_2$ interphase thickness (which is considered as the most important function of a cushion gas) during withdrawal but may lead to lower breakthrough pressure. An increase in cushion gas concentrations (such as $CH_4$) in depleted oil and gas reservoirs, may promote $H_2$ diffusion over caprock which could in turn limit the structural trapping of $H_2$ in the reservoir as the excessive rise in $CH_4$ may lead to a lower breakthrough pressure due to lower IFT values.

The present disclosure demonstrates that even under such a broad range of reservoir conditions (temperature, pressure, and salinity), the CA for $H_2$/brine/rock and $H_2$—$CH_4$/brine/ rock mixture will have an identical wettability property independent of pressure and salinity in real field operations which could vary based on experimental methodology. However, the fraction of $H_2$ and $CH_4$ (in an $H_2$—$CH_4$—$CO_2$—$N_2$ mixture) on ST will depend on whether the field operation is targeted towards long-term or short-term storage/withdrawal as higher $H_2$ fraction promotes storage (due to very high ST) whereas higher $CH_4$ fraction promotes withdrawal (due to its low ST).

The present disclosure discloses an extensive experimental investigation on the effect of $CH_4$ and $H_2$ mixtures in the presence of $CO_2$ and $N_2$ mimicking a depleted natural gas condition. The sessile drop method was used to investigate different gas mixtures ($H_2$—$CH_4$—$CO_2$—$N_2$)/brine/pristine quartz substrates whereas the pendant drop technique was used to examine the gas/brine surface tension relevant for large-scale $H_2$ storage. The range of pressure varied between 500 to 4000 psi, temperature from 30 to 70° C., and NaCl brine salinities from 2 to 20 wt. %. According to the present disclosure, in the wettability investigation, CA is fully dependent on temperature (as it strongly decreases with increasing temperature). No noticeable effect was observed between CA with pressure and salinity. ST decreases very slightly with increasing pressure, but strongly with increasing temperature. The change of ST with NaCl brine salinity is inconsistent, thus, salinity has minimal impact. In addition, an increase in $H_2$ fraction will lead to higher ST between the gas mixture and brine phases, which in turn slightly increases the pressure required to displace brine from the pore space in the storage medium. Column height estimates based on the capillary effect of seal rock had higher values compared to that which considers both capillary effects from seal and reservoir rocks. Test case 3 was selected as the optimal gas mixture based on CA, ST and relative column heights for $H_2$ storage and withdrawal. This mixture 3 (60% $H_2$-30% $CH_4$-5% $CO_2$-5% $N_2$) is however, applicable to reservoir conditions at 2 wt. % (at 40° C.) and 5 wt. % (at 30 and 40° C.) NaCl brine salinity. Beyond this reservoir conditions, Test cases 4, 5, 6 and 7 are most favorable due to their low ST values as the trapped gas can be easily mobilized.

Numerous modifications and variations of the present disclosure are possible in light of the above teachings. It is therefore to be understood that within the scope of the appended claims, the invention may be practiced otherwise than as specifically described herein.

The invention claimed is:

1. A method of storing hydrogen ($H_2$) gas in a subsurface formation having at least one injection well, at least one production well and at least one heat well penetrating the subsurface formation, comprising:
   injecting a $H_2$-containing fluid stream into the subsurface formation via the at least one injection well to form a storage composition containing a gas-phase mixture, a liquid-phase mixture and a solid matrix;
   wherein the gas-phase mixture of the storage composition comprises:
   10 to 90% of $H_2$;
   5 to 80% of methane ($CH_4$);
   1 to 10% of carbon dioxide ($CO_2$);
   1 to 10% of nitrogen ($N_2$); and
   each % is based on a total volume of the gas-phase mixture;
   wherein the liquid-phase mixture of the storage composition comprises at least one water-soluble mineral; and
   wherein the solid matrix of the storage composition comprises clay, shale, slate, and minerals; and
   heating the subsurface formation containing the storage composition via the at least one heat well thereby achieving a storage condition and maintaining the storage condition.

2. The method of claim 1, wherein the gas-phase mixture of the storage composition comprises:
   20 to 80% of $H_2$;
   10 to 70% of $CH_4$;
   about 5% of $CO_2$;
   about 5% of $N_2$; and
   each % is based on the total volume of the gas-phase mixture.

3. The method of claim 1, wherein the gas-phase mixture of the storage composition further comprises up to 5% of hydrogen sulfide ($H_2S$), based on the total volume of the gas-phase mixture.

4. The method of claim 1, wherein the gas-phase mixture of the storage composition further comprises up to 5% of moisture ($H_2O$), based on the total volume of the gas-phase mixture.

5. The method of claim 1, wherein the subsurface formation comprises one of a hydrocarbon-containing reservoir, a natural gas storage space, a carbon sequestration reservoir, an aquifer, a geothermal reservoir, and an in-situ leachable ore deposit.

6. The method of claim 1, wherein the subsurface formation comprises a rock material obtained from at least one shale selected from the group consisting of Eagle ford shale, Wolfcamp shale, Posidonia shale, Wellington shale, and Mancos shale.

7. The method of claim 6, wherein the rock material comprises one or more of Bentheimer sandstone, Berea sandstone, Vosges sandstone, quartz, borosilicate glass, basalt, shale, calcite, granite, dolomite, gypsum, anhydrite, mica, kaolinite, illite, montmorillonite, and coal.

8. The method of claim 1, wherein the at least one water-soluble mineral comprises one or more of sodium bicarbonate, sodium carbonate, sodium chloride, potassium bicarbonate, potassium carbonate, and potassium chloride.

9. The method of claim 1, wherein the at least one water-soluble mineral is present in the liquid-phase mixture at a concentration of 0.1 to 30 wt. % based on a total weight of the liquid-phase mixture.

10. The method of claim 1, wherein the at least one water-soluble mineral is sodium chloride, and wherein the sodium chloride is present in the liquid-phase mixture at a concentration of 2 to 20 wt. % based on a total weight of the liquid-phase mixture.

11. The method of claim 1, wherein the solid matrix of the storage composition further comprises silicate, argillite, quartz, sandstone, gypsum, conglomerate, basalt, feldspar, mica, granite, granodiorite, diorite, calcite, kaolinite, illite, montmorillonite, and sand.

12. The method of claim 1, wherein the storage condition has a temperature in a range of 20 to 80 degree Celsius (° C.) in the subsurface formation, a water contact angle of 15 to 60 degrees (°) under a pressure of 500 to 4000 pound-force per square inch (psi) in the subsurface formation, and a surface tension in a range of 40 to 85 dynes per centimeter (dynes/cm) under the pressure of 500 to 4000 psi in the subsurface formation.

13. The method of claim 1, wherein the storage condition has a pressure of 300 to 5000 psi in the subsurface formation, a water contact angle with the subsurface formation in a range of 10 to 50° under a temperature of 30 to 70° C. in the subsurface formation, and a surface tension in a range of 50 to 80 dynes/cm under the temperature of 30 to 70° C. in the subsurface formation.

14. The method of claim 1, wherein the gas-phase mixture of the storage composition comprises about 60% of $H_2$, about 40% of $CH_4$, about 5% of $CO_2$, about 5% of $N_2$, and each % is based on the total volume of the gas-phase mixture;
the liquid-phase mixture comprises 2 to 5 wt. % of NaCl based on a total weight of the liquid-phase mixture; and
the storage condition has a temperature in a range of 30 to 40° C.

15. The method of claim 1, further comprising:
withdrawing the gas-phase mixture of the storage composition from the subsurface formation via the at least one production well;
introducing the gas-phase mixture into a hydrogen purification device comprising a plurality of hydrogen-selective membranes;
wherein the plurality of hydrogen-selective membranes are permeable to hydrogen gas, but are at least substantially impermeable to other components in the gas-phase mixture;
passing the gas-phase mixture through the plurality of hydrogen-selective membranes in the hydrogen purification device thereby allowing hydrogen gas to pass through the hydrogen-selective membrane and rejecting other components in the gas-phase mixture to form a residue composition; and
collecting the hydrogen gas after passing and recycling the residue composition.

16. The method of claim 15, wherein the plurality of hydrogen-selective membranes in the hydrogen purification device is arranged in parallel, and wherein each membrane of the plurality of hydrogen-selective membranes is placed in a plane perpendicular to the direction of the gas-phase mixture flow in the hydrogen purification device.

17. The method of claim 1, wherein the at least one heat well is in the form of a closed-loop pipeline having an aboveground loop part and an underground loop part.

18. The method of claim 17, wherein the underground loop part has a helix shape.

19. The method of claim 17, wherein the underground loop part includes a perforated casing.

* * * * *